US012438700B1

(12) United States Patent
Campagna et al.

(10) Patent No.: US 12,438,700 B1
(45) Date of Patent: Oct. 7, 2025

(54) THRESHOLD ENCRYPTION AND DECRYPTION USING A KEY MANAGEMENT SERVICE IN A PROVIDER NETWORK

(71) Applicant: Amazon Technologies, Inc., Seattle, WA (US)

(72) Inventors: Matthew J Campagna, Bainbridge Island, WA (US); Shay Gueron, Haifa (IL)

(73) Assignee: Amazon Technologies, Inc., Seattle, WA (US)

( * ) Notice: Subject to any disclaimer, the term of this patent is extended or adjusted under 35 U.S.C. 154(b) by 365 days.

(21) Appl. No.: 17/854,359

(22) Filed: Jun. 30, 2022

(51) Int. Cl.
*H04L 9/08* (2006.01)
*H04L 9/06* (2006.01)
*H04L 9/14* (2006.01)
*H04L 9/30* (2006.01)

(52) U.S. Cl.
CPC .......... *H04L 9/0825* (2013.01); *H04L 9/0618* (2013.01); *H04L 9/0894* (2013.01); *H04L 9/14* (2013.01); *H04L 9/3073* (2013.01)

(58) Field of Classification Search
CPC ... H04L 9/0825; H04L 9/0618; H04L 9/0894; H04L 9/14; H04L 9/3073; H04L 63/0428; H04L 63/062; H04L 9/083; H04L 9/0861; H04L 63/064; G06F 21/6209
See application file for complete search history.

(56) References Cited

U.S. PATENT DOCUMENTS

| | | | | |
|---|---|---|---|---|
| 6,396,929 | B1* | 5/2002 | Chandersekaran ... | H04L 9/0894 713/181 |
| 6,823,070 | B1* | 11/2004 | Smith .................. | H04L 9/0894 380/282 |
| 6,910,129 | B1* | 6/2005 | Deng .................. | H04L 63/0861 713/169 |
| 8,719,952 | B1* | 5/2014 | Damm-Goossens ...... | H04L 9/3226 726/28 |
| 9,130,744 | B1* | 9/2015 | King ........................ | H04L 9/14 |
| 9,773,243 | B1* | 9/2017 | Spies .................... | G07F 7/1016 |
| 9,819,487 | B2* | 11/2017 | Fujii ..................... | H04L 9/3073 |
| 10,263,775 | B2* | 4/2019 | Setty .................... | H04L 9/0894 |
| 10,326,803 | B1* | 6/2019 | Haney .................... | H04L 63/30 |

(Continued)

*Primary Examiner* — Ninos Donabed
(74) *Attorney, Agent, or Firm* — Nicholson De Vos Webster & Elliott LLP

(57) ABSTRACT

Techniques for using a key management service to provide K of N threshold encryption and decryption in a provider network. The techniques encompass a K of N threshold encryption process and a K of N threshold decryption process. The encryption process can include encrypting a plaintext datum using a first key to produce a ciphertext datum. A secret sharing algorithm can be used to produce N plaintext shares of the first key. The N plaintext shares can be encrypted using N public keys of N asymmetric key pairs to produce N ciphertext shares. The decryption process can include recovering K plaintext shares from K of the N ciphertext shares. The K ciphertext shares can be recovered by the key management service decrypting the K ciphertext shares using K private keys of the N asymmetric key pairs to recover the K plaintext shares. The first key can be recovered from the K plaintext shares. The plaintext datum can be recovered by decrypting the ciphertext datum using the recovered first key.

20 Claims, 10 Drawing Sheets

(56) References Cited

U.S. PATENT DOCUMENTS

| | | | | |
|---|---|---|---|---|
| 10,467,422 | B1* | 11/2019 | Roth | G06F 21/602 |
| 2002/0087860 | A1* | 7/2002 | William Kravitz | H04L 9/0894 |
| | | | | 713/168 |
| 2003/0076960 | A1* | 4/2003 | Chandersekaran | H04L 9/0894 |
| | | | | 380/277 |
| 2008/0292096 | A1* | 11/2008 | Schneider | H04L 9/0618 |
| | | | | 380/28 |
| 2009/0316900 | A1* | 12/2009 | Qiu | H04L 9/083 |
| | | | | 380/258 |
| 2010/0124328 | A1* | 5/2010 | Schneider | H04L 9/065 |
| | | | | 380/42 |
| 2011/0069834 | A1* | 3/2011 | Urbanik | H04L 63/045 |
| | | | | 380/28 |
| 2016/0253515 | A1* | 9/2016 | Damgård | H04L 63/062 |
| | | | | 713/165 |
| 2019/0325147 | A1* | 10/2019 | Lu | H04L 9/0897 |
| 2020/0162246 | A1* | 5/2020 | Schouppe | H04L 9/0894 |
| 2021/0194928 | A1* | 6/2021 | Halford | H04L 9/0833 |
| 2021/0273784 | A1* | 9/2021 | Gryb | H04L 9/085 |
| 2021/0288798 | A1* | 9/2021 | Vadhera | H04L 9/083 |
| 2022/0166605 | A1* | 5/2022 | Suurkivi | H04L 9/0897 |

* cited by examiner

THRESHOLD ENCRYPTION AND DECRYPTION USING A KEY MANAGEMENT SERVICE IN A PROVIDER NETWORK

BACKGROUND

The present disclosure relates generally to computing, computer networking, and information processing and, more particularly, to systems and methods for a key management service supporting K of N threshold encryption and decryption.

An "encryption key" or just "key" is used to cryptographically encrypt, decrypt, and re-encrypt data. In addition to the actual key material used to encrypt and decrypt data, a key can encompass metadata such as, for example, an identifier of the key, a creation date of the key, a description of the key, and a key state.

Encryption of data encompasses using a key and an encryption algorithm applied to unencrypted data (sometimes called "plaintext") to produce encrypted data (sometimes called "ciphertext"). The ciphertext has the property that recovering the original unencrypted data from the encrypted data is impractical without possession or knowledge of a key that can be used to decrypt the encrypted data. Decryption of encrypted data encompasses using a key capable of decrypting the encrypted data and a decryption algorithm applied to the encrypted data to recover the original data from the encrypted data.

One type of key is a symmetric key. A symmetric key can be used for symmetric encryption and decryption of data. With a symmetric key, the same key is used to encrypt and decrypt data. For example, a symmetric key can encompass an industry standard 256-bit encryption key such as, for example, a 256-bit key based on an Advanced Encryption Standard (AES) symmetric algorithm.

Another type of key is an asymmetric key. An asymmetric key represents a mathematically related "public" and "private" key pair. For example, the public and private key pair can be mathematically related based on a Rivest-Shamir-Adleman (RSA) public-private key algorithm or an Elliptic-curve cryptography (ECC) public-private key algorithm. An asymmetric key can be used for encryption and decryption of data. When used for encryption and encryption of data, the public key typically is used to encrypt data and the private key to decrypt data.

An asymmetric key can also be used to sign and verify data. Signing data encompasses creating a message digest of the data by applying a message digest algorithm to the data. A signature that represents the data is generated by using the private key and a signing algorithm applied to the message digest. For example, the message digest algorithm can be based on a cryptograph hash algorithm in the Secure Hash Algorithm (SHA) family of algorithms or other suitable cryptographic hash function. The signature can be verified using the public key and a verification algorithm applied to the message digest and the signature. The signing algorithm and the verification algorithm can be based on an RSA or an ECC algorithm, as examples. Successful verification confirms that the original data was signed using the private key and the signing algorithm, and that the original data has not been modified since it was signed.

A provider network (or "cloud" provider network) provides a user with the ability to use a computing-related resource such as a compute resource (e.g., executing a virtual machine (VM) instance or container, executing a batch job, executing code without provisioning a server), a data/storage resource (e.g., object storage, block-level storage, data archival storage, a database, a database table, etc.), a network-related resource (e.g., configuring a virtual network, a content delivery network (CDN), a Domain Name Service (DNS)), an application resources (e.g., a database, an application build or deployment service), an access policy or role, an identity policy or role, a machine image, a router or other data processing resource, etc. A computing resource can be provided by the provider network as a service, such as a hardware virtualization service that can execute a compute instance, a storage service that can store a data object, etc.

A user (or "customer") of the provider network can use a user account (or "customer account") to access a service provided by the provider network. A user can interact with the provider network across an intermediate network (e.g., the Internet) via an interface, such as through use of an application programming interface (API) call, via a console implemented as a website or an application, etc.

An API refers to an interface or communication protocol between a client computing device (e.g., a client computing device of a user) and a server computing device in the provider network, such that if the client computing device makes a request in a predefined format, the client computing device should receive a response in a specific format or initiate a defined action. In the provider network context, an API provides a gateway for the client computing device to access provider network infrastructure by allowing the client computing device to obtain data from or cause actions within the provider network, enabling the development of applications that interact with resources and services hosted in the cloud provider network. An API can also a service of the cloud provider network to exchange data with another service of the provider network.

A provider network can provide on-demand, self-service, location independence, rapid elasticity, and measured scale computing to customers. Business, industries, and organizations are exploiting these characteristics to increase profit, revenue, and productivity by shifting formerly in-house computing tasks to the cloud. However, data security is significant obstacle to this shift. There can be a perception by customers that their data is less secure when processed and stored on external provider network devices than when processed and stored on on-premises devices that are completely controlled by the customer, even if the opposite is true in practice. Thus, techniques that improve the security of data processed and stored in the cloud would be appreciated.

BRIEF DESCRIPTION OF DRAWINGS

Various examples in accordance with the present disclosure will be described with reference to the drawings, in which.

DETAILED DESCRIPTION

Figure 1:
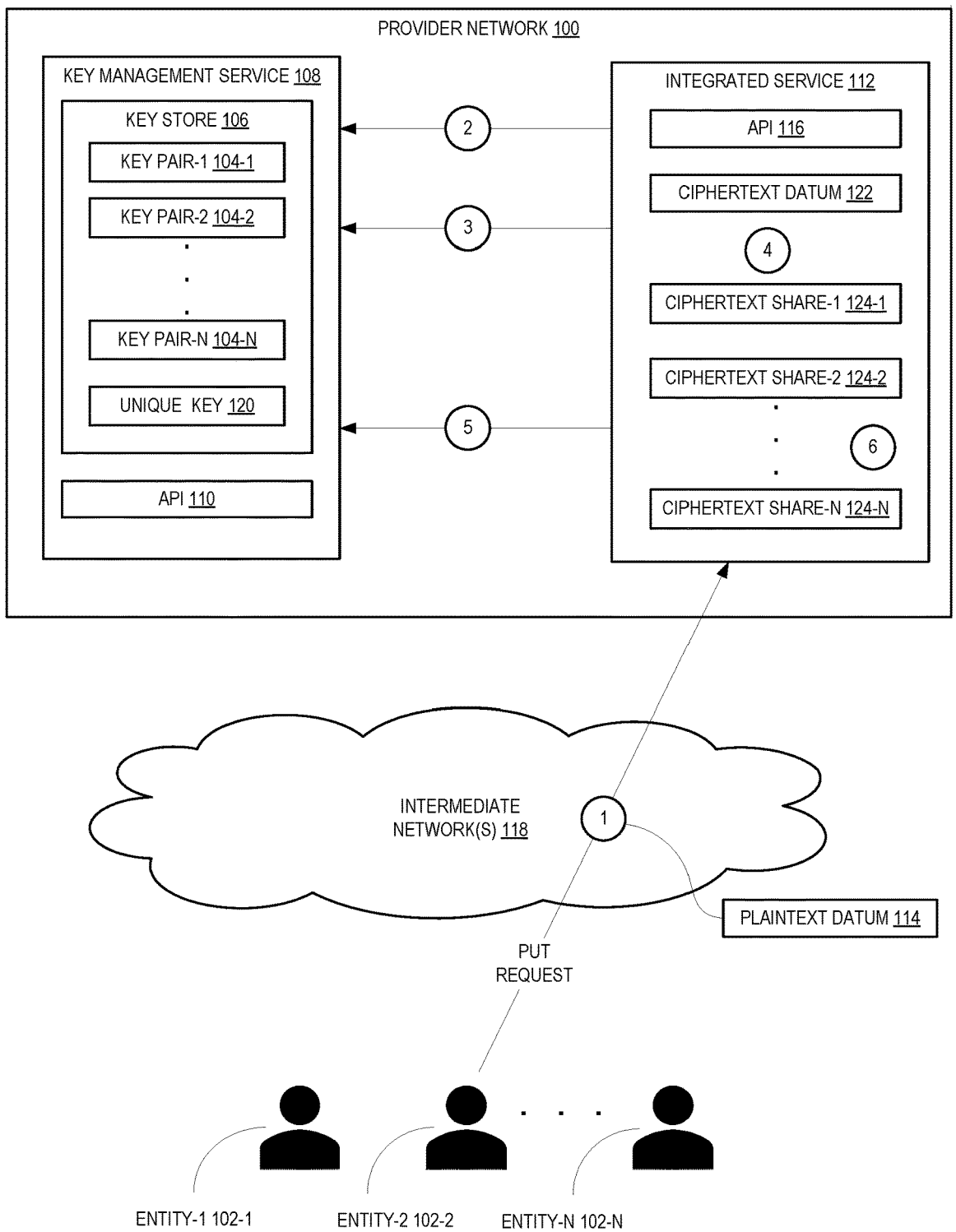
FIG. 1 illustrates a provider network environment in which a K of N threshold encryption process is performed, according to some examples.

The present disclosure relates to techniques for a key management service supporting K of N threshold encryption and decryption in a provider network.

The techniques encompass a method for a key management service supporting K of N threshold encryption and decryption. The method encompasses a K of N threshold encryption process and a K of N threshold decryption process. The encryption process can include encrypting a plaintext datum using a first key to produce a ciphertext datum. A secret sharing algorithm can be used to produce N plaintext shares of the first key. The N plaintext shares can be encrypted using N public keys of N asymmetric key pairs to produce N ciphertext shares. The decryption process can include recovering K plaintext shares from K of the N ciphertext shares. The K ciphertext shares can be recovered by decrypting the K ciphertext shares using K private keys of the N asymmetric key pairs to recover the K plaintext shares. The first key can be recovered from the K plaintext shares. The plaintext datum can be recovered by decrypting the ciphertext datum using the recovered first key.

In some examples, the encryption and decryption process can be performed by a provider network. The provider network can act as a trusted process that is trusted to decrypt the K ciphertext shares using the K private keys and to recover the first key from the K plaintext shares. The techniques also encompass a system that includes a set of one or more computing devices to implement the encryption and decryption process.

The security of data stored in the cloud can be a precondition on a willingness of users to store their data in the cloud. One way to secure data stored in the cloud is to encrypt the data when it is "at rest" stored on cloud servers. The data can be decrypted upon request from a user with authorization. Conventionally, a key that is private to the user can be used to encrypt and decrypt the user's data. Unfortunately, if the user's key is "lost" (e.g., because the user forgot the access password or the user becomes incapacitated), then the data may be unrecoverable in its unencrypted form. This is a problem if the data is needed by other authorized users such as, for example, corporate data that executives or board members are authorized to access or other data that a group of users are authorized to access.

Techniques herein achieve both the security objectives of keeping data stored in the cloud secured with encryption while providing resilience in the event of key loss, using K of N threshold encryption and decryption of data in a provider network. A key management service of the provider network provides encryption and decryption services to an integrated service of the provider network. The integrated service uses the key management service to implement K of N threshold encryption and decryption processes.

As an example of a problem addressed by the techniques herein, consider a user Alice that wishes to use the integrated service to store, send, or share a datum (e.g., a document, an electronic message, a file, a key, etc.). User Alice may wish to store, send, or share the datum with users Bob, Charlie, and David or allow users Bob, Charlie, and David to access the datum from the integrated service (e.g., in the event Alice is incapacitated). However, Alice may not want any one of them to have unilateral access to the datum. Instead, for various possible reasons, Alice may wish that at least two of them grant permission to access to the datum before any one of them is granted access to the datum. This can be accomplished using the techniques disclosed herein.

In particular, Alice can authenticate with the integrated service (e.g., by username and password) and provide (e.g., upload) the datum to the integrated service from their personal computing device in the context of an authenticated user session established between their personal computing device and the integrated service. The integrated service can encrypt the datum using an encryption key that is not known to Alice, Bob, Charlie, or David. For example, the encryption key can be one generated specifically to encrypt the datum. The encrypted datum can be stored by the integrated service. The upload request or another request from Alice's personal computing device can specify that users Bob, Charlie, and Dave are trusted users that can access the decrypted datum from the integrated service according to the K of N threshold decryption process where K is at least two (according to Alice's access policy) and N is four for users Alice, Bob, Charlie, and David.

Continuing the example, the integrated service can shard the encryption key into N shares using a secret sharing algorithm such that one share is generated for each of the N users and so that the encryption key used to encrypt the datum cannot be reconstructed from less than K of the N shares. For example, the secret sharing algorithm can be Shamir's secret sharing algorithm or other secret sharing algorithm suitable for generating N shares of the encryption key such that the encryption key can be efficiently recovered from K or more of the N shares and where the encryption key cannot be recovered from fewer than K shares.

Continuing the example, the key management service can store a pre-generated asymmetric key pair for each of the N users. The integrated service can encrypt, or request the key management service to encrypt, each of the N shares of the encryption key using a public key of a respective one of the N users' asymmetric key pairs. The integrated service can store the N encrypted shares in association with the encrypted datum. By doing so, the N shares are encrypted such that each of the N users cannot decrypt more than one of the N shares without access to other users' private keys.

At a later time, one of the N users (e.g., Bob) can request access to the datum from the integrated service. Bob, or the integrated service on Bob's behalf, can request the key management service to decrypt Bob's encrypted share of the encryption key using the private key of Bob's asymmetric key pair. However, by virtue of the secret sharing algorithm, a single share is not sufficient to recover the encryption key. At least a second user (e.g., Charlie) can request access to the datum in association with Bob's request. In this case, Charlie, or the integrated service on Charlie's behalf, can additionally request the key management service to decrypt Charlie's encrypted share of the encryption key using the private key of Charlie's asymmetric key pair. Now with two decrypted shares of the encryption key, the encryption key can be recovered using the secret sharing algorithm and the recovered encryption key can be used to decrypt the encrypted datum.

In the above example, at least K shares of the encryption key are needed by a process trusted by the N users to recover the key used to encrypt the datum. For example, the trusted process can be controlled by one the N users. However, in this case one of the N users has access to the recovered encryption key. This can be undesirable since the one user can use the encryption key to unilaterally decrypt the datum.

In some examples, the provider network including the integrated service and the key management service can be the trusted process. In this case, no one user of the N users can access the encryption key. Instead, the provider network, acting as the trusted process, can decrypt users' encrypted shares using the users' private keys on behalf of the users (e.g., Bob and Charlie in the example above). Then, with at least K decrypted shares, the provider network can recover the encryption key decrypt the encrypted datum using the encryption key. By doing so, none of the N users can gain access to the encryption key.

These and other examples will now be described in greater detail with respect to the figures.

FIG. 1 illustrates a provider network environment in which a K of N threshold encryption process is performed, according to some examples. In FIG. 1 and in other figures described herein, steps of a process are represented by numbered circles. Directional arrows are used represent a direction of data flow between respective components but not necessarily the exclusive direction. Data that flows between depicted components can traverse one or more intermediate components (e.g., network devices or other computing devices). Such an intermediate component may not be depicted the figure to avoid obscuring the invention and for the purpose of providing a clear example.

The K of N threshold encryption process can be performed in the context of a provider network environment such as the example environment depicted in FIG. 1. Provider network 100 is programmed or configured to adhere to a "cloud" computing model that enables ubiquitous, convenient, on-demand network access to a shared pool of configurable resources such as networks, servers, storage applications, and services. The resources can be rapidly provisioned and released with minimal management effort or service provider interaction. A user of provider network 100 can unilaterally provision computing capabilities in provider network 100, such as server time and network storage, as needed automatically without requiring human interaction with each service provider.

Capabilities of provider network 100 can be available over one or more intermediate network(s) 118 and accessed through standard mechanisms that promote use by heterogeneous thin or thick client platforms such as mobile phones, tablets, laptops, and workstations. Computing resources such as storage, processing, memory, and network bandwidth in provider network 100 can be pooled to serve multiple users using a multi-tenant model, with different physical and virtual resources dynamically assigned and reassigned according to user demand. There can be a sense of location independence in that the user generally can have no control or knowledge over the exact location of provided resources but can be able to specify location at a higher level of abstraction such as, for example, at the level of a country, state, or datacenter.

Provider network 100 can automatically control and optimize resource use by leverage a metering capability (e.g., on a pay-per-use or on a charge-per-use basis) at a level of abstraction appropriate to the type of service such as storage, processing, bandwidth, and active user accounts. Resource usage in provider network 100 can be monitored, controlled, and reported, providing transparency for both the provider and the user of a utilized service.

Provider network 100 can provide its capabilities to users according to a variety of different service models including Software-as-a-Service ("SaaS"), Platform-as-a-Service ("PaaS"), and Infrastructure-as-a-Service ("IaaS").

With SaaS, a capability is provided to a user using the provider's software applications running on the infrastructure of provider network 100. The applications can be accessible from various client devices through either a thin client interface such as a web browser, or a program interface. The infrastructure includes the hardware resources such as server, storage, and network components and software deployed on the hardware infrastructure that are necessary to support the services being provided.

Typically, under the SaaS model, the user does not manage or control the underlying infrastructure including network, servers, operating systems, storage, or individual application capabilities, except for limited user-specific application configuration settings. With PaaS, the user is provided the capability to deploy onto hardware and software infrastructure of provider network 100 user-created or acquired applications using programming languages, libraries, services, and tools supported by the provider or other sources.

Typically, under the PaaS model, the user does not manage or control the underlying hardware and software infrastructure including network, servers, operating systems, or storage, but has control over the deployed applications and possibly configuration settings for the application-hosting environment.

With IaaS, the user is provided the capability to provision processing, storage, networks, and other fundamental computing resources where the user can deploy and run arbitrary software, which can include operating systems and applications. The user does not manage or control the underlying hardware and software infrastructure but has control over operating systems, storage, and deployed applications and possibly limited control of selecting network components such as, for example, host firewalls.

Provider network 100 can provide its capabilities to a user according to a variety of different deployment models including as a private cloud, as a community cloud, as a public cloud, or as a hybrid cloud.

In a private cloud, the hardware and software infrastructure of provider network 100 is provisioned for exclusive use by a single organization which can comprise multiple users (e.g., business units). The private cloud can be owned, managed, and operated by the organization, a third party, or some combination of them, and it can exist on or off premises.

In a community cloud, the hardware and software infrastructure of provider network 100 is provisioned for exclusive use by a specific community of users from organizations that have shared concerns such as mission security requirements, policy, and compliance considerations. The community cloud can be owned, managed, and operated by one or more of the organizations in the community, a third party, or some combination of them, and it can exist on or off premises.

In a public cloud, the infrastructure is provisioned for open use by the public. The public cloud can be owned, managed, and operated by a business, academic, or government organization, or some combination of them. A public cloud exists on the premises of the public cloud provider.

In a hybrid cloud, the infrastructure is a composition of two or more distinct cloud infrastructures (private, community, or public) that remain unique entities, but are bound together by standardized or proprietary technology that enables data and application portability such as, for example, cloud bursting for load balancing between clouds.

To provide resource services to user, provider network 100 can rely upon virtualization techniques. For example, virtualization technologies can provide users the ability to control or use compute resources (e.g., a "compute instance," such as a virtual machine (VM) using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by provider network 100 to perform a variety of computing tasks. Additionally, or alternatively, a user can indirectly use a compute resource by submitting code to be executed by provider network 100 (e.g., via on-demand code execution service 102-1), which in turn uses one or more compute resources to execute the code—typically without the user having any control of or knowledge of the underlying compute instance(s) involved.

A user of provider network 100 can use a user account that is associated with a customer account, though these terms can be used somewhat interchangeably depending upon the context of use. A user can interact with provider network 100 across intermediate network(s) 118 (e.g., the internet, a cellular network, etc.) via an interface, such as through use of an application programming interface (API) call, via a console implemented as a website or application, etc.

An API refers to an interface or communication protocol between a client and a server, such that if the client makes a request in a predefined format, the client should receive a response in a specific format or initiate a defined action. In context of provider network 100, an API provides a gateway for a customer to access cloud infrastructure by allowing the customer to obtain data from or cause an action within provider network 100, enabling the development of an application that interacts with a resource or a service hosted in the provider network 100. An API can also enable a service of provider network 100 to exchange data with another service of provider network 100.

The K of N threshold encryption process can include N number of entities 102. For example, FIG. 1 depicts N entities 102-1, 102-2, . . . , 102-N. An entity 102 can correspond to a user of provider network 100. An entity 102 can correspond to an asymmetric key-pair 104 in key store 106 of key management service 108 in provider network 100. For example, FIG. 1 depicts N asymmetric key pairs 104-1, 104-2, . . . , 104-N that correspond to N entities 102-1, 102-2, . . . , 102-N, respectively. While in some examples an entity 102 corresponds to a user, an entity 102 can also correspond to a business, organization, school, governmental agency, or other entity that has delegated authority to the user to act on behalf of the entity.

In some examples, API 110 of key management service 108 is invoked to create an asymmetric key pair 104 for an entity 102. Each asymmetric key pair 104 can include a public key and a private key belonging to a respective one of the entities 102. For example, API 110 can offer a CreateKey function or the like for creating an RSA or ECC asymmetric key pair for a specified entity 102. Key management service 108 can store created asymmetric key-pairs in key store 106.

Access to key store 106 via API 110 can be access controlled by key management service 108. For example, key management service 108 can restrict access to the private key of a key pair 104 via API 110 to only the entity 102 to which the key pair belongs or a set of one or more users authorized by the entity 102. At the same time, key management service 108 can allow a broader set of users (e.g., any user) to access the public key of the key pair 104 via API 110.

In some examples, key management service 108 or integrated service 112 can perform low-level encryption and decryption operations using a set of one or more Hardware Security Modules (HSMs). Such operations can include key generation, key storage, key management, encryption functions, digital signature functions, asymmetric cryptography functions, or symmetric cryptographic functions. A HSM can take the form of a plug-in peripheral card or external device that can be attached directly another computing device or server. A HSM of key management service 108 can encompass a set one or more secure crypto-processor chips designed to prevent tampering or bus probing. Integrated service 112 can also be configured with a set of one or more HSMs for performing cryptographic operations described herein according to the requirements of the particular implementation at hand.

While in some examples, a key pair 104 of an entity 102 is used only for K of N threshold encryption and decryption, a key pair 104 of an entity 102 can be used for other purposes such as encryption and decryption of data or signing and verifying outside the context of the K of N threshold encryption and decryption.

In addition to storing asymmetric key pairs, key store 106 can store symmetric keys. Access to symmetric keys stored in key store 106 can also be access controlled by key management service 108. API 110 can allow a requester to create a symmetric key for storage in key store 106 and to access a previously created symmetric key in key store 106. Like with asymmetric key pairs 104, access controls enforced by key management service 108 can allow only authorized users to access symmetric keys stored in key store 106 via API 110.

Integrated service 112 can be a service of provider network 100 that uses key management service 108 to implement K of N threshold encryption and decryption for user data managed by integrated service 112. Generally, integrated service 112 can be any web, application, or online service of provider network 100 having a need for K of N threshold encryption and decryption of user data. For example, integrated service 112 can be an object storage service that stores user data as objects in buckets. Integrated service 112 can be an electronic mail service for sending and receiving user email messages. Integrated service 112 can be a logging service for recording web and application service activity as user log file data. Integrated service 112 can be a database service for storing, retrieving, and indexing user database data. Integrated service 112 can be a centralized network file system service for managing user file data.

In any case, integrated service 112 can provide an API 116 that allows a user to "PUT" a user datum into integrated service 112 and "GET" a user datum from integrated service 112. The exact semantics of PUT and GET can vary depending on the type of integrated service 112. For example, if integrated service 112 is an object storage service, then PUT can correspond to storing a set one or more data objects and GET can correspond to retrieving the set of data objects. If integrated service 112 is an electronic mail service, then PUT can correspond to sending an electronic message and GET can correspond to receiving the electronic message. If integrated service 112 is a logging service, then PUT can correspond to storing user log file data and GET can correspond to accessing the stored user log file data. If integrated service 112 is a database service, then PUT can correspond to storing database data in a database and GET can correspond to retrieving the database data from the database. If integrated service 112 is a centralized network file system service, then PUT can corresponding to creating or modifying a file in the file system and GET can correspond to opening, reading, sharing, or synchronizing the file.

Likewise, a user datum that is K of N threshold encrypted and decrypted can vary depending on the type of integrated service 112. Broadly speaking, the user datum can be any data that an entity 102 requests to PUT into integrated service 112. For example, a user datum can be any of: a file or a portion of a file, a document or a portion a document, a key or a portion of a key, database data or a portion of the database data, formatted data or a portion of the formatted data (e.g., formatted as XML, CSV, JSON, YAML, BSON, MESSAGE PACK, PROTOCOL BUFFERS, etc.), or other set of bytes.

The K of N threshold encryption process according to some examples will now be explained in greater detail with reference to FIG. 1.

At Step 1, an entity (e.g., 102-2) requests to PUT plaintext datum 114 into service 112. The PUT request can be sent from a personal computing device of entity 102-2. The personal computing device can be a mobile phone, a desktop computer, a laptop computer, a laptop computer, etc. For example, the PUT request can be sent from the personal computing device toward integrated service 112 in response to entity 102-2 interacting with a graphical user interface of an application (e.g., a web or mobile application) executing on personal computing device, or the PUT request can be sent from the personal computing device automatically by the application acting on behalf of (e.g., authenticated with service 112 as) entity 102-2. While the PUT request can contain plaintext datum 114, the PUT request can refer to the plaintext datum 114 by a Uniform Resource Locator (URL) or other like locator or network address where plaintext datum 114 can be retrieved, downloaded, fetched, or otherwise located and obtained by integrated service 112 in response to receiving the PUT request.

The PUT request can be received by integrated service 112 (e.g., via API 116). For example, the PUT request (and other requests herein) can be received as one or more Secure-Hyper Text Transfer Protocol (HTTPS) requests that transit a set of one or more intermediate networks 118 that connect the personal computing device to provider network 100. In general, any request or response between a personal computing device of an entity 102 and integrated service 112 can be transmitted using HTTPS or other like protocol that is secured by encryption to protect transmitted data from unwanted access by third parties with access to intermediate network(s) 118.

The PUT request can specify that plaintext datum 114 is to be K of N threshold encrypted. Alternatively, a configuration associated with a user account of the entity 102-2 and accessible to integrated service 112 can indicate that plaintext datum 114 is to be K of N threshold encrypted. The PUT request or configuration can indicate the set of N entities 102-1, 102-2, . . . , 102-N that are trusted under K of N threshold encryption and decryption to GET plaintext datum 114 from service 112. The request or configuration can also indicate K, the minimum number of the N entities that are required to authorize a GET of plaintext datum 114 from service 112. For example, K of N might be 2 of 3 or 2 of 4 or 4 of 7, etc. It should be noted that K need not be strictly less than N and K can be equal to N, according to the requirements of the particular implementation at hand. Further, while some examples might imply that N is greater than two, there is no requirement that this be the case and N can be greater than or equal to two, according to the requirements of the particular implementation at hand.

The user datum to be K of N threshold encrypted is in some instances referred to herein as a "plaintext datum" as in plaintext datum 114. As used herein, a plaintext datum merely refers to a datum that is not encrypted by a particular key. The term "plaintext" is not intended to mean that the datum is limited to text data and not intended to mean that the datum is not encrypted by another key.

Continuing with the discussion of the K of N threshold encryption process, at Step 2, integrated service 112 invokes API 110 of key management service 108 to create unique key 120. Unique key 120 can be a unique symmetric key. For example, unique key 120 can be a 256-bit symmetric key generated according to the AES-256-GCM algorithm or the like, or other industry standard symmetric key algorithm capable of generating quantum resistant symmetric keys or at least symmetric keys that make brute force attacks on ciphertexts infeasible.

Upon creation of unique key 120, key management service 108 can store unique key 120 in key store 106 for later access by integrated service 112 via API 110. While in some examples unique key 120 is created in response to a PUT request, unique key 120 can be pre-generated by the time of a PUT request is received by integrated service 112. For example, integrated service 112 can invoke API 110 to pre-generate a pool of unique keys to use in response to subsequent PUT requests. Alternatively, integrated service 112 can pre-generate the pool of unique keys and invoke API 110 to store the pre-generated keys in key store 106. While in some examples a different unique key is used for each different plaintext datum to be K of N threshold encrypted, the same unique key can be used for different plaintext data.

While in some examples integrated service 112 invokes API 110 of key management service 108 to create unique key 120, integrated service 112 can create unique key 120. In this case, integrated service 112 can still invoke API 110 to store unique key 120 in key store 106, although this is not required and integrated service 112 can simply store unique key 120 at integrated service 112 without also requesting key management service 116 to store unique key 120 in key store 106.

At Step 3, integrated service 112 requests key management service 108 to encrypt plaintext datum 114 using unique key 120. Unique key 120 can be used to encrypt plaintext datum 114 PUT by entity 102-2 in Step 1 to produce ciphertext datum 122. Ciphertext datum 122 is an encrypted form of plaintext datum 114 that is encrypted using unique key 120.

In some examples, if plaintext datum 114 is larger than a maximum size that can be encrypted by key management service 108, then plaintext datum 114 is broken into chunks by integrated service 112 where each chunk is no larger than the maximum size and each chunk is encrypted using unique key 120. The maximum size can vary depending on the type of key and encryption algorithm used to encrypt. In some examples, the maximum size is 4096 bytes for AES-256-GCM. As a result of Step 3, ciphertext datum 122 is generated and stored at integrated service 112. Ciphertext datum 122 can encompass an encrypted form of plaintext datum 114 that is generated using unique key 120.

While in some examples integrated service 112 at Step 3 invokes API 110 to request key management service 108 to encrypt plaintext datum 114 using unique key 120, integrated service 112 at Step 3 can encrypt plaintext datum 114 using unique key 120. For example, integrated service 112 can retain use unique key 120 to encrypt plaintext datum 114. Integrated service 112 can encrypt plaintext datum 114 instead of key management service 108 to avoid the data communications overhead of sending plaintext datum 114 to key management service 108 and receiving ciphertext datum 122 from key management service 108.

At Step 4, integrated service 112 can apply a secret sharing algorithm to unique key 120 to generate N plaintext shares of unique key 120. The secret sharing algorithm can be based on a cryptographic technique used to protect the confidentiality of unique key 120 by dividing it into a number of pieces called shares. The technique can encompass two main parts: a message sharing algorithm for dividing unique key 120 into shares and a message reconstruction algorithm for recovering unique key 120 from all or a subset of the shares. The secret sharing algorithm can be capable of dividing unique key 120 into N number of shares such that unique key 120 can be recovered from any K or more number of the N shares where K is greater than or equal to two and less than or equal to N and such that unique key 120 cannot practically be entirely recovered from less than K shares. In some examples, the secret sharing algorithm is based on the Shamir secret sharing algorithm or based on other like efficient secret sharing algorithm (e.g., Blakley's secret sharing or the Chinese remainder theorem). In the case where K equals N, then the secret sharing algorithm can be an XOR-based algorithm or other secret sharing algorithm that requires all N shares to recover unique key 120.

While in some examples integrated service 112 executes the secret sharing algorithm to generate N plaintext shares of unique key 120, integrated service 112 invokes execution of a secret sharing algorithm by key management service 108 in other examples. For example, integrated service 112 can invoke execution of a secret sharing algorithm applied to unique key 120 at key management service 108 via API 110 of key management service 108. The result of this invoking including a set of N number of plaintext shares of unique key 120 output from the execution of the secret sharing algorithm by key management service 108 can be returned by key management service 108 to integrated service 112.

At Step 5, integrated service 112 can request key management service 108 via API 110 to encrypt each of the N plaintext shares of unique key 120 using the public key of a respective key pair 104 such that each of the N plaintext shares of unique key 120 is encrypted using a different one of the public keys of the N key pairs 104 belonging to the N entities 102. This produces a set of N number of ciphertext shares 124 of unique key 120 where each ciphertext share 124 of unique key 120 is generated using the public key of a respective key pair 104 to encrypt a different one of the N plaintext shares of unique key 120. For example, ciphertext share 124-1 of unique key 120 can be generated using the public key of key pair-1 104-1 belonging to entity 102-1 to encrypt a first plaintext share of the N plaintext shares of unique key 120, ciphertext share 124-2 of unique key 120 can be generated using the public key of key pair-2 104-2 belonging to entity 102-2 to encrypt a second plaintext share of the N plaintext shares of unique key 120, . . . , and ciphertext share 124-N of unique key 120 can be encrypted using the public key of key pair-N 104-N belonging to entity-N 102-N to encrypt the Nth plaintext share of the N plaintext shares of unique key 120. This way, each of the N entities 102 can decrypt at most one of the ciphertext shares 124 of unique key 120 assuming each of the entities 102 has access only to the private key of their own key-pair 104 and does not have access to the private keys of the other key pairs 104 belonging to the other entities 102.

While in some examples integrated service 112 at Step 5 can request key management service 108 via API 110 to encrypt each of the N plaintext shares of unique key 120 using the public key of a respective key pair 104, integrated service 112 at Step 5 can do this encryption. In this case, integrated service 112 may invoke API 110 of key management service 108 to retrieve the public keys of key pairs 104-1 . . . 104-N from key store 106. Once a public key is retrieved, it can be used to encrypt a respective plaintext share of unique key 120. Integrated service 112 can pre-fetch the public keys of key pairs 104 prior to the PUT request of Step 1 to avoid the overhead of retrieving the public keys from key store 106 in response to the PUT request.

At Step 6, integrated service 112 can store ciphertext shares 124 at integrated service 112 for later use during the K of N threshold decryption process. In some examples, ciphertext shares 124 are returned or otherwise provided or made available to entities 102 at Step 6. In particular, each ciphertext share 124 can be returned, provided, or made available to the respective entity 102 who's public key was used to encrypt the ciphertext share 124. For example, ciphertext share-1 124-1 encrypted with the public key of key pair-1 104-1 can be returned, provided, or made available to entity-1 102-1, ciphertext share-2 124-2 encrypted with the public key of key pair-2 104-2 can be returned, provided, or made available to entity-2 10-2, . . . , ciphertext share-N 124-N encrypted with the pubic key of key pair-N 104-N can be returned, provided, or made available to entity-N 102-N. Entities 102 can use their ciphertext shares 124 in the K of N threshold decryption process as discussed in greater detail elsewhere herein.

As a result of the K of N threshold encryption process, plaintext datum 114 cannot be recovered from ciphertext datum 122 without unique key 120. Unique key 120 can be recovered from ciphertext shares 124. However, at least K number of ciphertext shares 124 must first be decrypted using the private keys of the at least K respective key pairs 104. Thus, no one entity 102 can recover plaintext datum 114 from ciphertext datum 122 without the cooperation of at least K−1 other entities 102. In some examples, for extra security, unique key 120 is not retained in key store 106 or retained by integrated service 112 after ciphertext datum 122 and ciphertext shares 124 are created. This way, unique key 120 can only be recovered from ciphertext shares 124 according to a K of N threshold decryption process, which will now be described in greater detail.

Figure 2:
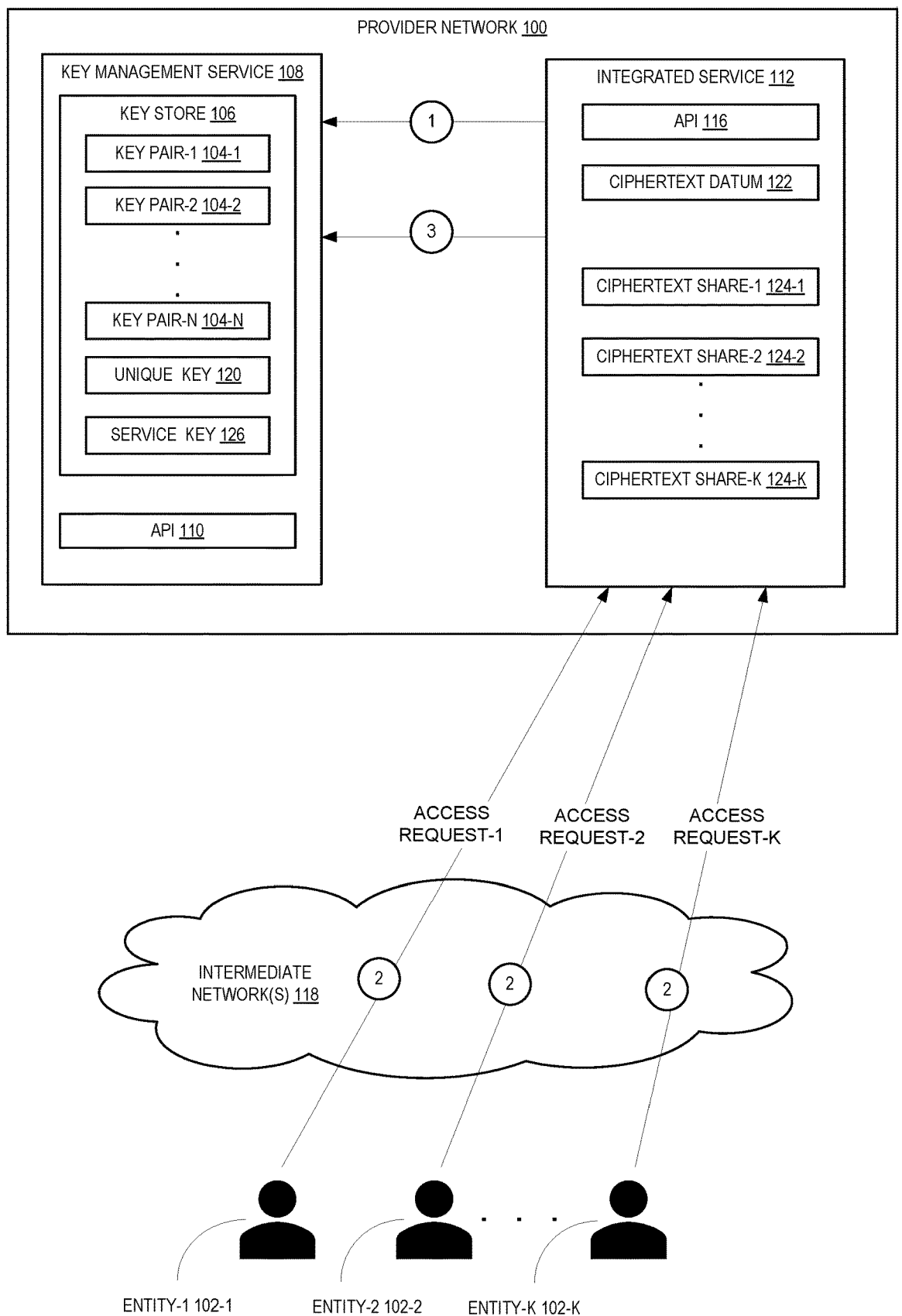
FIG. 2 illustrates the provider network environment in which steps of a K of N threshold decryption process are performed, according to some examples.

FIG. 2 illustrates the first three steps of a K of N threshold decryption process, according to some examples.

At Step 1, integrated service 112 can create service key 126. Service key 126 can be a unique symmetric key. As discussed in greater detail below, service key 126 can be used to re-encrypt K of the N shares of unique key 120. Recall that ciphertext shares 124 are generated by applying the public keys of key pairs 104 to plaintext shares of unique key 120. The K shares encrypted using service key 126 can be provided to entities 102 in lieu of providing K ciphertext shares 124 to entities 102. By doing this, entities 102 can be prevented from using the private keys of their respective key pairs 104 to recover unique key 120 from ciphertext shares 124. If service key 126 is kept secret from entities 102, then entities 102 cannot recover unique key 120 from shares of unique key 120 that are encrypted using service key 126.

While in some examples integrated service 112 at Step 1 invokes API 110 to request key management service 108 to create service key 126, integrated service 112 at Step 1 creates service key 126 in other examples. In this case, integrated service 112 can still invoke API 110 to request key management service 108 to store service key 126 in key store 106 for later retrieval by integrated service 112. Alternatively, integrated service 112 can create service key 126 and store service key 126 at integrated service 112 without also requesting key management service 108 to store service key 126 in key store 106.

Service key 126 can be unique to integrated service 112 or unique to a group of one or more hosts of integrated service 112. Different groups of hosts of integrated service 112 can use different service keys. A "host" can be a physical or virtual computing host. An example of a physical computing host is computing device 1000 described below with respect to FIG. 10. An example of a virtual host is a virtual machine, operating system container, or other virtual computing host process that executes on a physical computing host. The hosts that belong to a particular group of hosts can vary according to the requirements of the particular implementation at hand including the type of integrated service 112, geographic location, security requirements, customer requirements, user requirements, etc.

Service key 126 can be pre-generated. For example, service key 126 can be generated for use by a group of one or more hosts of integrated service 112. A host in the group may use service key 126 whenever it is needed by the host for a K of N threshold decryption process performed by the host. Service key 126 can be kept secret to the group of hosts or at least to service 112 and should not be made available to entities 102. For example, access controls of key management service 108 can be configured to allow only a particular set of hosts of integrated service 112 to access service key 126 from key store 106.

At Step 2, each entity 102 of K number of entities 102-1, 102-2, . . . 102-K requests integrated service 112 to access the plaintext form of ciphertext datum 122 (e.g., plaintext datum 114). These access requests can occur at the same time or at different times. The access requests can be coordinated or independent. For example, after ciphertext datum 122 is created, an electronic notification can be sent to each of the N entities 102. The notification can be sent or caused to be sent by integrated service 112, for example. The notification can be received by an entity 102 as an electronic message (e.g., an email message), a push notification, or an in-app notification, for example. The notification can inform each entity 102 of the availability of plaintext datum 114 from integrated service 112 according to K of N threshold decryption. The notification can include a hyperlink that when activated causes an access request to be sent to integrated service 112 on behalf of a requesting entity 102 to access plaintext datum 114.

As an alternative, one of the entities 102 can make an access request of integrated service 112 to access plaintext datum 114 using an application (e.g., a web or mobile application) on their personal computing device. In response to receiving the access request, integrated service 112 can inform the entity 102 that plaintext datum 114 is protected by K of N threshold encryption by returning an appropriate response to the access request. The application can allow the entity 102 to request one or more additional of the N entities 102 to participate in a multi-party access of plaintext datum 114. For example, assume the N entities 102 are users Alice, Bob, Charlie, and Dave. User Alice can use a web or mobile application on their personal computing device that is connected to or integrated with integrated service 112. A graphical user interface (GUI) of the application can inform Alice that users Bob and Dave are currently online using the application from their respective personal computing devices. The application can allow user Alice to send an in-app notification that is received by users Bob and David. The in-app notification can request users Bob and Dave to participate with user Alice in a multi-party access of plaintext datum 114 from integrated service 112. The in-app notification received by Bob can include a hyperlink that when activated causes an access request to be sent to integrated service 112 on behalf of Bob. The in-app notification received by Dave can include a hyperlink that when activated causes an access request to be sent to integrated service 112 on behalf of Dave. User Alice can receive an in-app notification when user Bob and Dave each sent their access requests. User Alice can use their application instance to also cause an access request to be sent from their personal computing device to integrated service 112 on behalf of Alice.

Each access request can be authenticated by integrated service 112 such that an identity of the entity 102 making the access request can be established. In particular, for a given access request, integrated service 112 can determine which key pair 104 belongs to the requesting entity 102 and can determine which ciphertext share 124 was encrypted by the requesting entity 102's public key.

In response to receiving an access request to access plaintext datum 114 from one of the K entities 102 at Step 2, integrated service 112, at Step 3, can request key management service 108 via API 110 to decrypt the ciphertext share 124 that was encrypted using the requesting entity 102's public key of the requesting entity 102's key pair 104. Such decryption by key management service 108 can be performed using the requesting entity 102's private key of the requesting entity 102's key pair. Integrated service 112 can request key management service 108 to decrypt the requesting entity 102's ciphertext share 124 on behalf of the requesting entity 102 using forwarded authentication credentials or other identity management technique that allows integrated service 112 to make the decryption request of key management service 108 on behalf of and with the permissions of the requesting entity 102. The key management service 108 can return the requesting entity 102's ciphertext share 124 as a plaintext share after decrypting the requesting entity 102's ciphertext share 124 using the requesting entity 102's private key of the requesting entity 102's key pair 104. Integrated service 112 can then request key management service 108 via API 110 to encrypt the requesting entity 102's plaintext share using service key 126. Step 3 can be performed for each access request from the K entities 102 so that each of the K entities 102 (their personal computing devices) receives the respective entity 102's share of unique key 120 encrypted by service key 126.

As an alternative, key management service 108 can offer a re-encrypt operation via API 110. In this case, integrated service 112 at Step 3 can request key management service 108 to re-encrypt a ciphertext share 124 using service key 126. In this case, key management service 108 can decrypt the ciphertext share 124 using the requesting entity 102's private key to yield the underlying plaintext share and encrypt the plaintext share using service key 126. The share encrypted using service key 126 can then be returned to integrated service 112. By offering a re-encrypt operation via API 110, only one invocation of API 110 by integrated service 112 for each of the K access requests is needed to obtain K shares of unique key 120 re-encrypted using service key 126 as opposed to two invocations for each of the K access requests (one to decrypt a ciphertext share 124 and another to encrypt the underlying plaintext share using service key 126.)

Figure 3:
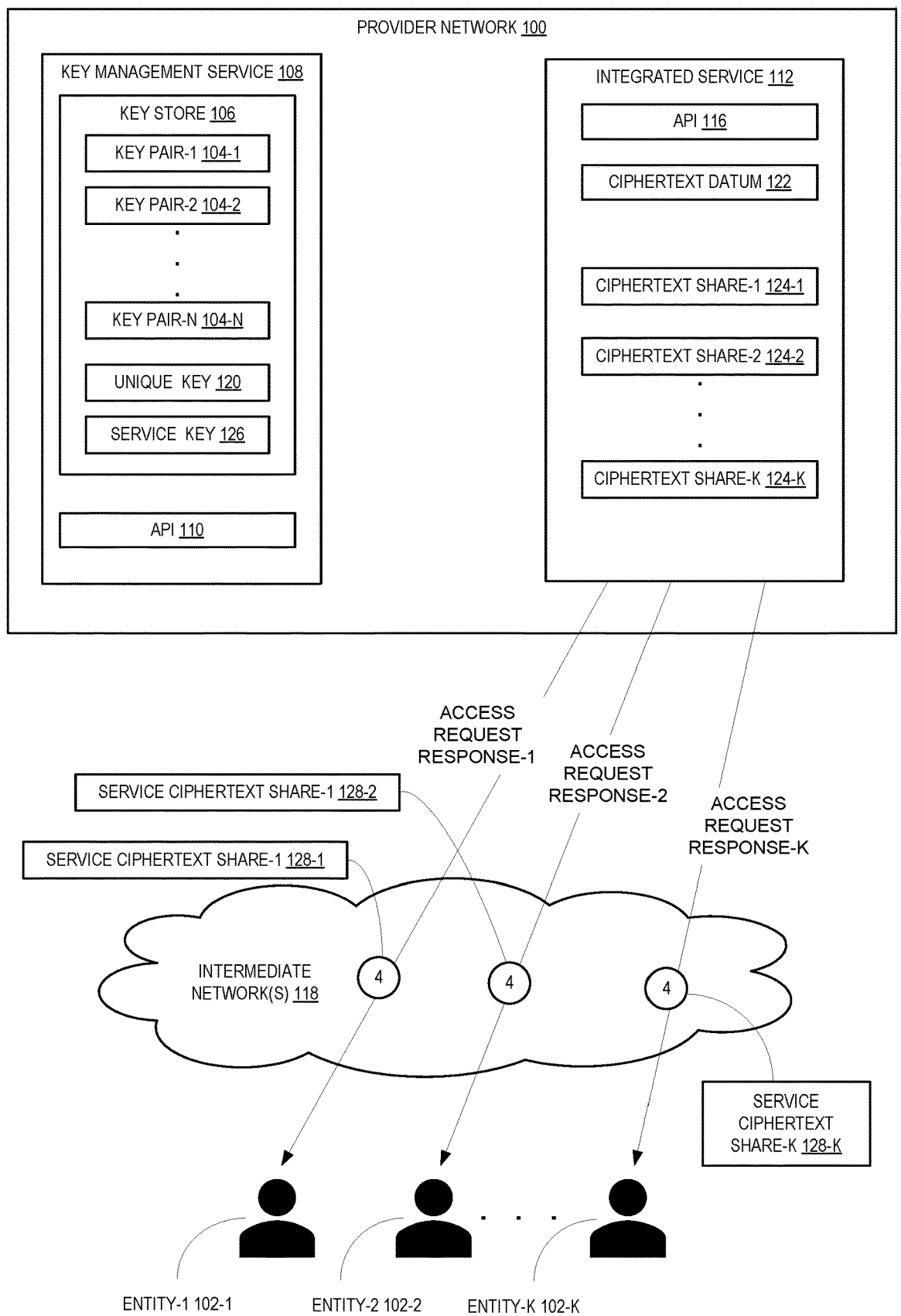
FIG. 3 illustrates the provider network environment in which additional steps of the K of N threshold decryption process are performed, according to some examples.

Turning now to FIG. 3, it shows Step 4 of the K of N threshold decryption process. At Step 4, each of the K entities 102 receives, as a response to the respective access request (Step 2), their share of unique key 120 encrypted by service key 126. The encrypted shares are designated as service ciphertext share-1 128-1, service ciphertext share-2 128-2, . . . , service ciphertext share-K 128-K which are each encrypted using service key 126 and are distinct from ciphertext share-1 124-1, ciphertext share-2 124-2, . . . , ciphertext share-K 124-K which are each encrypted using a respective one of the public keys of key pairs 104. Upon receiving their service ciphertext share 128, it can be stored at the respective entity 102's personal computing device.

Figure 4:
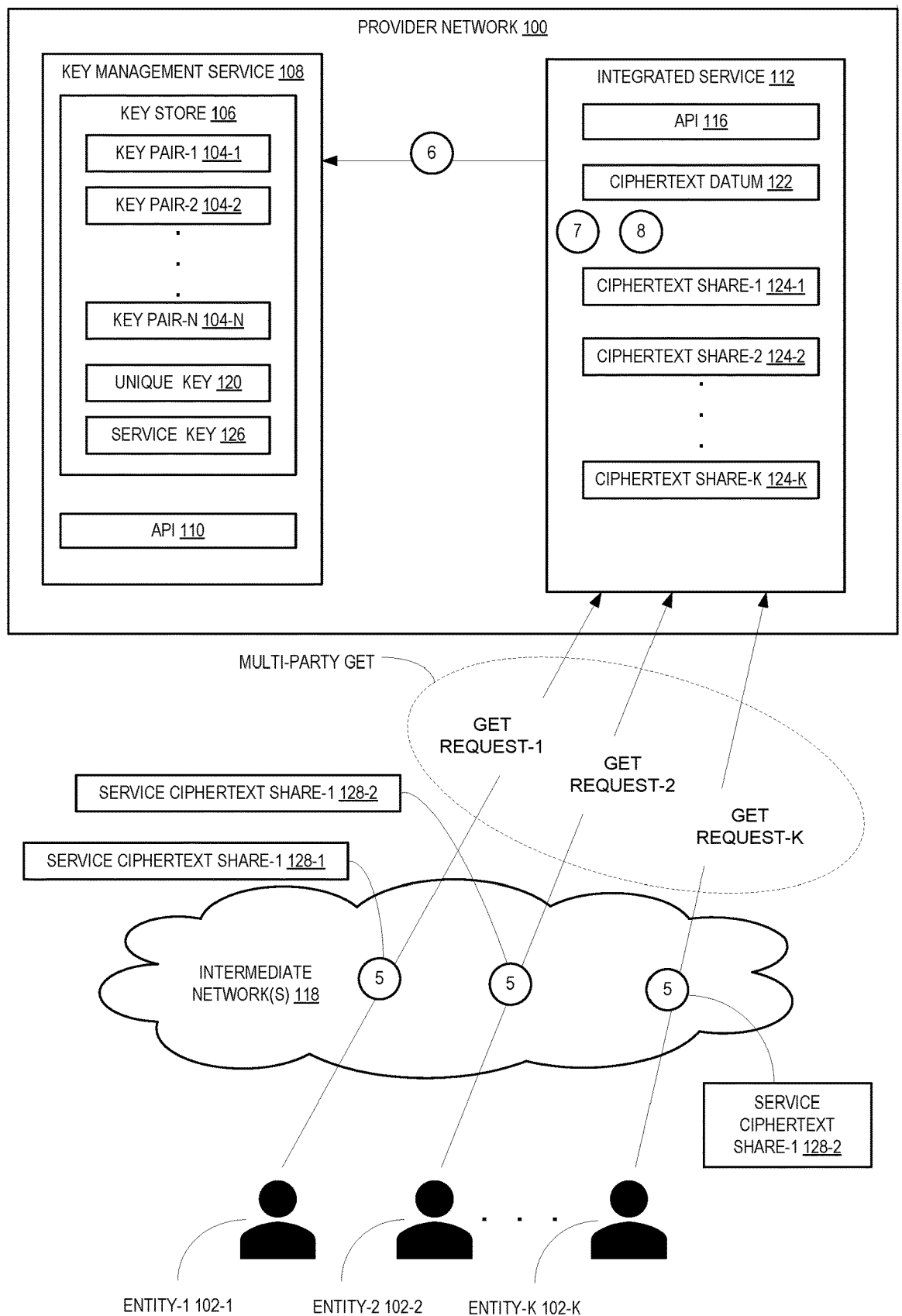
FIG. 4 illustrates the provider network environment in which additional steps of the K of N threshold decryption process are performed, according to some examples.

Turning now to FIG. 4, it shows Step 5 of the K of N threshold decryption process. At or about the same time, each of the K entities 102 make a GET request from their respective personal computing devices. Each GET request is to access plaintext datum 114 and includes or refers to the server ciphertext share 128 received at Step 4. For example, the GET request from the personal computing device of entity-1 102-1 can include or reference entity-1 102-1's service ciphertext share-1 128-1, the GET request from the personal computing device of entity-2 102-2 can include or reference entity-2 102-2's service ciphertext share-2 128-2, . . . , and the GET request from the personal computing device of entity-K 102-K can include or reference entity-K 102-K's service ciphertext share-K 128-K. Collectively, the set of GET requests from the K entities 102 for plaintext datum 114 is referred to as a "multi-party GET".

In response to a multi-party GET, integrated service 112 can, at Step 6, request key management service 108 via API 110 to decrypt each service ciphertext share 128-1, 128-2, . . . , 128-N. This produces a set of K plaintext shares from which unique key 120 can be recovered by integrated service 112. While in some examples integrated service 112 at Step 6 can request key management service 108 via API 110 to decrypt the K service ciphertext shares 128, integrated service 112 can decrypt the K service ciphertext shares 128 using service key 126 that is stored at integrated service 112 or retrieved from key store 106 of key management service 108 via API 110.

At Step 7, integrated service 112 recovers unique key 120 from the set of K plaintext shares by applying the secret sharing algorithm to recover unique key 120 from the set of K plaintext shares.

Once unique key 120 is recovered, integrated service 112, at Step 8, requests key management service 108 via API 110 to decrypt ciphertext datum 122 using unique key 120. This decryption recovers plaintext datum 114. While in some examples key management service 108 at Step 8 decrypts ciphertext datum 122 using recovered unique key 120, integrated service 112 at Step 8 can decrypt ciphertext datum 122 using recovered unique key 120.

Figure 5:
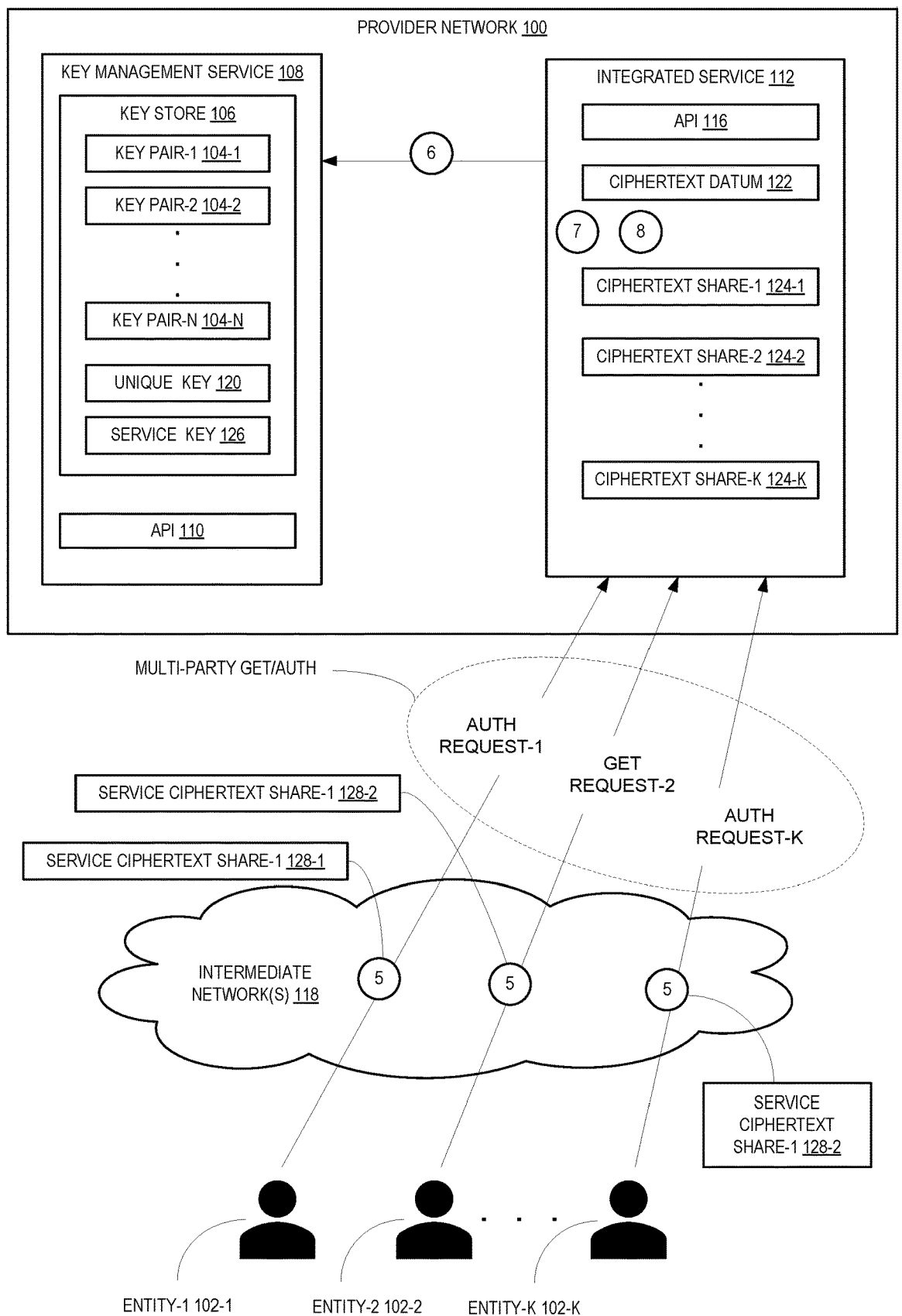
FIG. 5 illustrates the provider network environment in which additional steps of the K of N threshold decryption process are performed, according to some examples.

An alternative to the multi-party GET is depicted in FIG. 5, in which, at Step 5, one of the K entities (e.g., 102-2) makes a GET request from their personal computing device and each of the other K entities makes an AUTH request from the personal computing device. The GET request and the AUTH request(s) can be made at or about the same time. An AUTH request is like a GET request in that it can provide a service ciphertext share 128 that can be decrypted and used to recover unique key 120. However, an AUTH request does not request access to plaintext datum 114. Instead, it merely authorizes the GET request to access the plaintext datum 114 by providing a service ciphertext share 128. In the alternative, Step 7 can be performed to recover unique 120 from the set of K plaintext shares and Step 8 can be performed to recover plaintext datum 114 from ciphertext datum 122 using unique key 120. Collectively, the GET request for plaintext datum 114 with the K–1 AUTH requests of the GET request from the K entities 102 is referred to as a "multi-party GET/AUTH".

Figure 6:
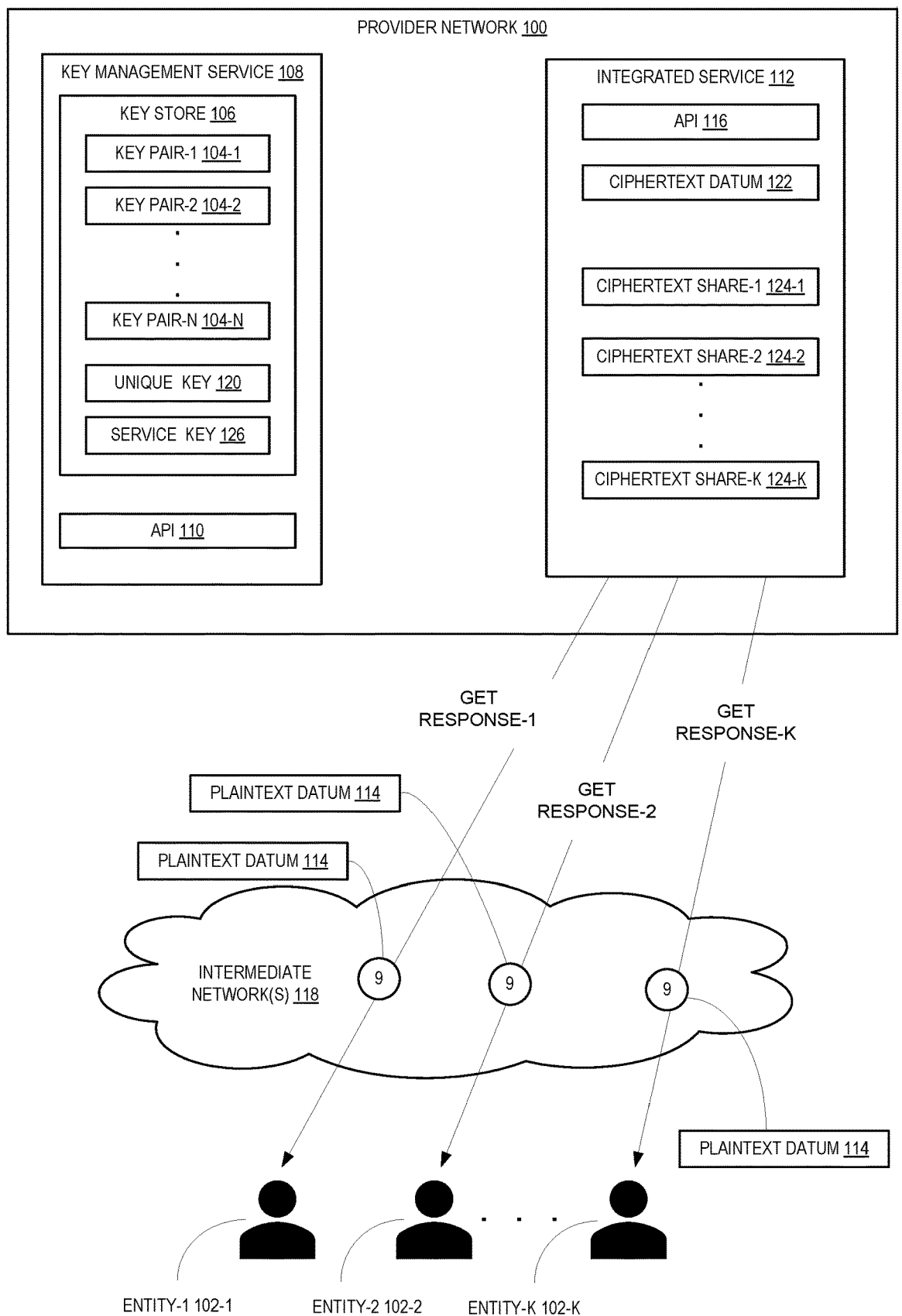
FIG. 6 illustrates the provider network environment in which additional steps of the K of N threshold decryption process are performed, according to some examples.

FIG. 6 shows the response to a multi-party GET in which the recovered plaintext datum 114 is returned to each requesting entity 102-1, 102-2, . . . , 102-K.

Figure 7:
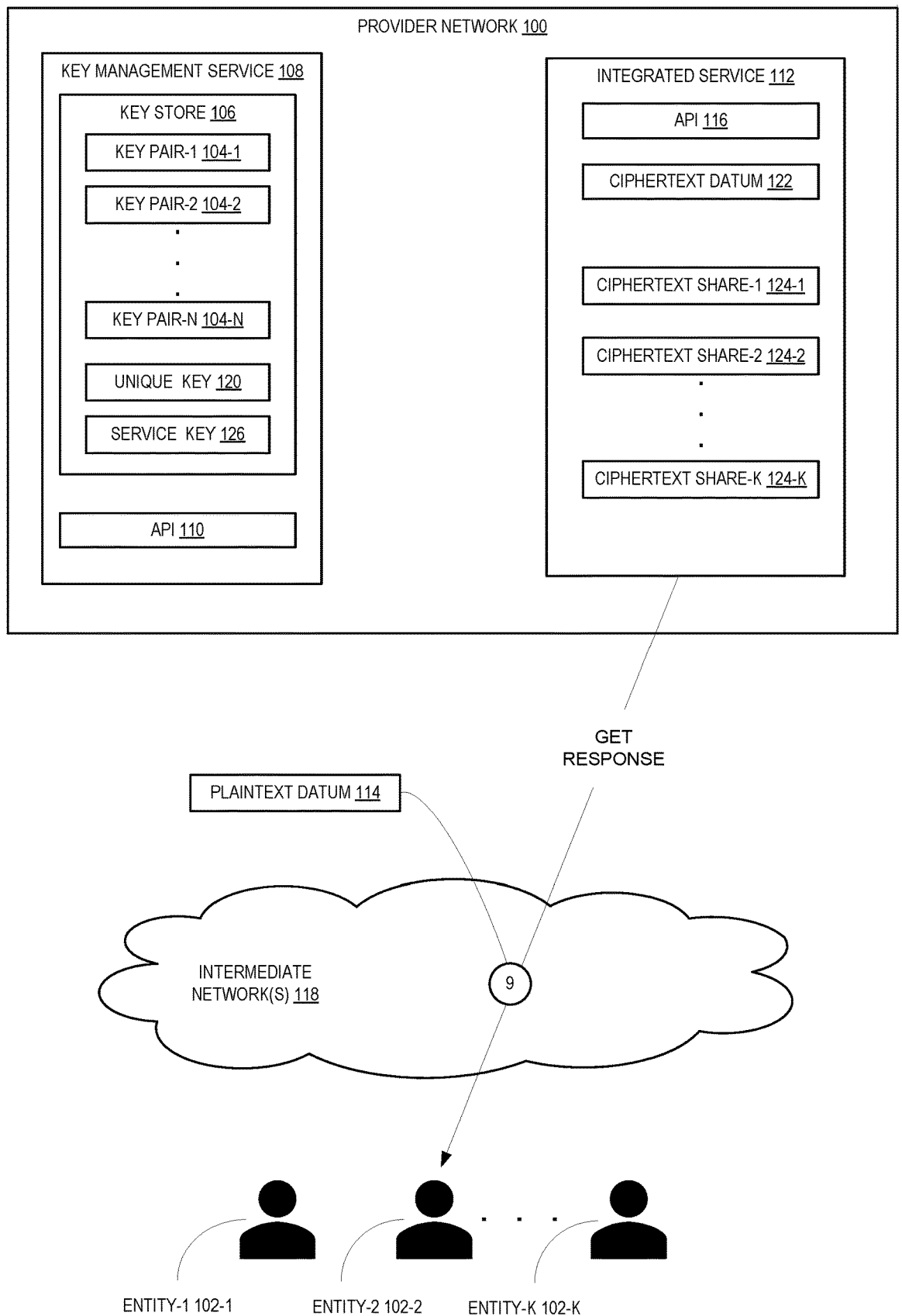
FIG. 7 illustrates the provider network environment in which additional steps of the K of N threshold decryption process are performed, according to some examples.

FIG. 7 shows the response to a multi-party GET/AUTH in which the recovered plaintext datum is returned to the entity 102-2 that made the GET request.

In some examples, a time limit is placed on how long a service ciphertext share 128 can be used to recover unique key 120. Recall that a service ciphertext share 128 can be returned to each of the K entities 102. The K entities 102 can then use the returned service ciphertext shares 128 in a multi-party GET or a multi-party GET/AUTH. The time limit can restrict the amount of time between when the K service ciphertext shares 128 are returned to the K entities 102 and when the K service ciphertext shares 128 can be validly used in a subsequent multi-party GET or a multi-party GET/AUTH. For example, the time limit can be a short as a few minutes or could be much longer (e.g., hours, days, weeks) according to the requirements of the particular implementation at hand. For example, the time limit can be set by a policy or configuration associated with plaintext datum 114 or ciphertext datum 122.

In some examples, a plaintext share is encrypted using service key 126, a current timestamp is included along with the plaintext share in the data to be encrypted. By doing so, a service ciphertext share 128 returned to an entity 102 can include the encrypted timestamp. When the service ciphertext share 128 is subsequently received from the entity 102 as part of a multi-party GET or a multi-party GET/AUTH, the service ciphertext share 128 can be decrypted using service key 126 and the timestamp recovered. The recovered timestamp can be compared by integrated service 112 to a current time to determine if the time limit has been exceeded. If the time limit has been exceeded, then integrated service 112 can refuse to recover unique key 120 using the expired share. Thus, the time limit prevents service ciphertext shares 128 from being used indefinitely to recover unique key 120.

In some examples, the GET or AUTH request of a multi-party GET or a multi-party GET/AUTH is sent in response to the personal computing device of an entity 102 receiving an access request response. The access request response can include a server ciphertext share 128. Upon receiving the access request response, an application (e.g., a web or mobile application) executing on the personal computing device can send a GET or an AUTH request as appropriate that includes the receiving server ciphertext share 128.

In some examples, GET or AUTH requests of a multi-party GET or a multi-party GET/AUTH are coordinated by electronic messaging. The requests can occur at the same time or at different times. The requests can be coordinated or independent. For example, after one of the K entities 102 (e.g., Alice) makes a GET request, an electronic notification can be sent to each of the other K entities 102 (e.g., Bob, Charlie, and David). The notification can be sent or caused to be sent by integrated service 112, for example. The notification can be received by an entity 102 (e.g., Bob, Charlie, or David) as an electronic message (e.g., an email message), a push notification, or an in-app notification, for example. The notification can inform each of the other K entities 102 (e.g., Bob, Charlie, and David) of the one of the K entity 102's GET request (e.g., Alice's GET request). The notification can include a hyperlink that when activated causes a GET or an AUTH request to be sent to integrated service 112 on behalf of a requesting entity 102 (e.g., Bob, Charlie, and David).

In some examples, all of the GET or AUTH requests of a multi-party GET or a multi-party GET/AUTH are routed to the same host or the same group of hosts. In particular, the requests are routed to the host or group of hosts which owns service key 126 used to produce server ciphertext shares 128. This way, the server ciphertext shares 128 in the requests can be decrypted by a host with access to service key 126. This also facilitates server state management in the case the requests of a multi-party GET or a multi-party AUTH are not received at the same time. In particular, a host or a group of hosts can maintain server state reflecting which of the K server ciphertext shares 128 have been received and decrypted so far. This state can include the plaintext shares that have been decrypted so far. When the host or a host in the group receives the Kth server ciphertext share 128, the share 128 can be decrypted and the resulting plaintext share can be used with the already decrypted shares 128 that are stored as part of the server state to recover unique key 120. In some examples, the server state is maintained for a limited amount of time such that K requests must be received by a host or a group of hosts with access to service key 126 within the limited amount of time. The limited amount of time can be a short as a few seconds or possibly longer (e.g., a few minutes or more) according to the requirements of the particular implementation at hand.

Figure 8:
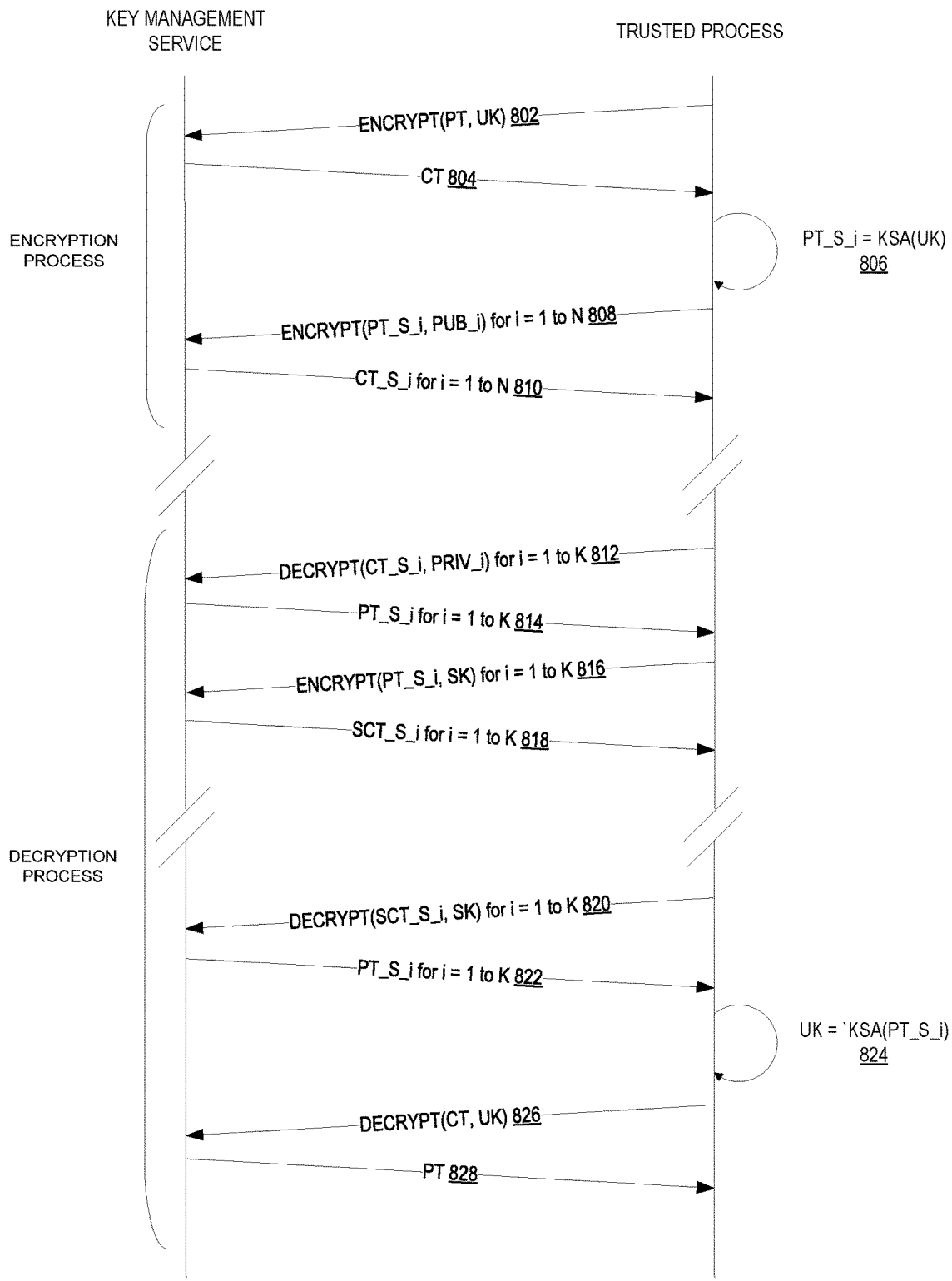
FIG. 8 illustrates interaction between a key management service and a trusted process implementing operations of a K of N threshold encryption process and a K of N threshold decryption process, according to some examples.

FIG. 8 is an interaction diagram showing operations of a K of N threshold encryption process and a K of N threshold decryption process, according to some examples. The operations are performed by a key management service (e.g., service 108) and a trusted process (e.g., integrated service 112 or one or more hosts thereof). Trusted process is trusted by N entities to access and use their respective shares of an encryption key to decrypt a ciphertext datum. While in some examples the trusted process is a host, a group of hosts, or a service in a provider network (e.g., 100), the trusted process is one of the entity's personal computing devices in other examples. For example, the set of personal computing devices of a set of entities can perform the K of N encryption process and the K of N decryption process in a peer-to-peer configuration where one or more of the personal computing devices in the set act as the trusted process. Further, while trusted process can be a host, a group of hosts, or a service in the same provider network as the key management service, the key management service and the trusted process can be in two different provider networks connected by intermediate network(s) 118.

At operation 802, the trusted process sends a request to the key management service to encrypt a plaintext datum PT using a specified unique key UK. The key management service encrypts the plaintext datum PT using the unique key UK and returns a ciphertext datum CT to the trusted process at operation 804. The ciphertext datum CT encompasses an encrypted form of the plaintext datum PT. In a variation, the trusted process encrypts the plaintext datum PT using the specified unique key UK instead of requesting the key management service to do so. In this case, operation 804 of returning the ciphertext datum CT from key management service to the trusted process might not be performed.

At operation 806, the trusted process applies a secret sharing algorithm to the unique key UK to generate a set of N number of plaintext shares PT_S_i of unique key UK, where i ranges from 1 to N.

At operation 808, the trusted process requests the key management service to encrypt each of the N plaintext shares PT_S_i using a respective entity's public key of a set of public keys PUB_i belonging to the N entities, where i ranges from 1 to N. As a result, each of the N plaintext shares PT_S_i is encrypted by a different one of the N entities' public keys PUB_i. In a variation, the trusted process encrypts each of the N plaintext shares PT_i using a respective entity's public key of the set of public keys PUB_i instead of requesting the key management service to do so. In this case, operation 810 might not be performed.

At operation 810, the key management service returns N ciphertext shares CT_S_i that result from encrypting the N plaintext shares PT_S_i using the N public keys PUB_i. The trusted process can store the N ciphertext shares CT_S_i for later reference by the K of N threshold decryption process. The K of N encryption process is now complete.

Operation 812 starts the K of N decryption process. At operation 812, the trusted process requests the key management service to decrypt K of the N ciphertext shares CT_S_i using K private keys of the N private keys PRIV_i that are mathematically related (e.g., one of the same public-private key pair) to the K public keys of the N public keys PUB_i used to encrypt the K ciphertext shares. For example, assume N is four and K is two. As a result of operation 808, N plaintext shares PT_S_1, PT_S_2, PT_S_3, and PT_S_4 for entities 1, 2, 3, and 4 respectively are encrypted by N public keys PUB_1, PUB_2, PUB_3, and PUB_4 respectively to produce N respective ciphertext shares CT_S_1, CT_S_2, CT_S_3, and CT_S_4. At operation 812 then, K ciphertext shares CT_S_1 and CT_S2 are decrypted by K private keys PRIV_1 and PRIV_2 respectively to produce K respective plaintext shares PT_S_1 and PT_S_2.

At operation 816, the trusted process requests the key management service to encrypt the K plaintext shares PT_S_i recovered from the K ciphertext shares CT_S_i using a service key SK.

At operation 818, the key management service returns K service ciphertext shares SCT_S_i generated by the key management service by encrypting the K plaintext shares using the service key SK. For example, the trusted process can request key management service to encrypt plaintext shares PT_S_1 and PT_S_2 using the service key SK to produce K service ciphertext shares SCT_S_1 and SCT_S_2.

Figure 9:
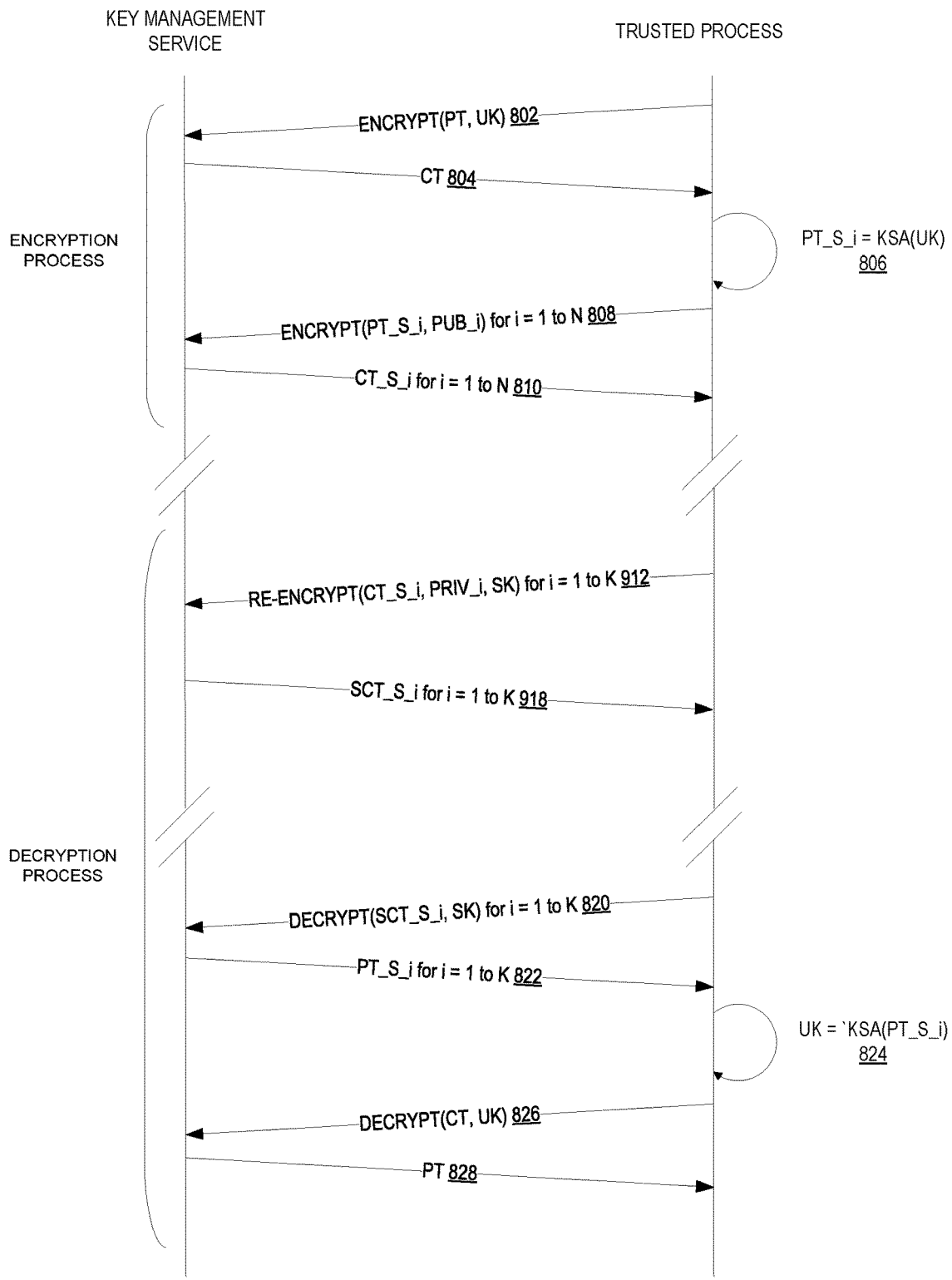
FIG. 9 illustrates a modification to the interaction depicted in FIG. 8, according to some examples.

As an alternative to operations 812, 814, 816, and 818, the trusted process can request the key management service to re-encrypt the K ciphertext shares using the service key SK. In this alternative, the key management service decrypts the K ciphertext shares using the K private keys PRIV_i to recover the K plaintext shares and encrypts the K plaintext shares using the service key SK to produce the K service ciphertext shares SCT_S_i. This alternative is depicted in FIG. 9 in which operations 812, 814, 816, and 818 are replaced by operations 912 and 918. At operation 912, the trusted process requests the key management service to re-encrypt the K ciphertext shares by decrypting them using the K private keys and encrypting the recovered K plaintext shares using the service key SK. At operation 918, the K server ciphertext shares SCT_S_i are returned to the trusted process.

Returning to FIG. 8, the K of N threshold decryption process continues at operation 820 where the trusted process requests the key management service to decrypt the K service ciphertext shares SCT_S_i using the service key SK. As a result, the trusted process receives K plaintext shares PT_S_i at operation 822. In a variation, the trusted process decrypts the K service ciphertext shares SCT_S_i using the service key SK instead of requesting the key management service to do so. In this variation, operation 822 might not be performed.

At operation 824, the trusted process recovers the unique key UK from the K plaintext shares PT_S_i using the secret sharing algorithm.

At operation 826, the trusted process requests the key management service to decrypt the ciphertext datum CT using the recovered unique key UK. The decrypted plaintext datum PT is returned to the trusted process at operation 828. This completes the K of N threshold decryption process. In a variation, the trusted process decrypts the ciphertext datum CT using the recovered unique key UK instead of requesting the key management service to do so. In this case, operation 828 might not be performed.

The above description of FIG. 8 illustrates some examples of the present invention. However, various modifications are possible.

In one modification, the operation 806 of applying a secret sharing algorithm to the unique key K to generate the N plaintext shares PT_S_i and the operation 808 of encrypting the N plaintext shares PT_S_i with the N public keys PUB_i can be performed before the operation 802 of encrypting the plaintext datum PT to generate the ciphertext datum CT.

In a related modification, the N ciphertext shares CT_S_i that are generated prior to encrypting the plaintext datum PT can be used as Additional Authenticated Data (AAD) for the encryption of the plaintext datum PT and the decryption of ciphertext datum CT. Generally speaking, AAD is data that can be used as an integrity check and can help protect plaintext datum from a confused deputy attack. In a confused deputy attack, the trusted process might be tricked into decrypting the ciphertext datum CT on behalf of a malicious entity. To defend against a confused deputy attack, the trusted process can use the N ciphertext shares CT_S_i or a portion thereof as ADD for encryption of the plaintext datum PT and decryption of the ciphertext datum CT. If the trusted process will not grant access to the N ciphertext shares C_S_i to a malicious user (e.g., because of access controls enforced by the trusted process), then the ADD used to encrypt the plaintext datum PT will not be available to decrypt the ciphertext datum CT when requested by the malicious user unless the malicious user can also trick the trusted process into using the corrected AAD.

In another modification, the service key SK is not used. Instead, each of the N entities is provided with their respective ciphertext share CT_S_i of the unique key UK that was encrypted using their respective public key. The plaintext datum PT is then recovered from the ciphertext datum CT by a trusted one of the N entities and the recovered plaintext datum PT can be shared with one or more other entities. The recovery of the plaintext datum PT can proceed in a chain involving K entities. At the first entity in the chain, the first entity uses its private key to decrypt its ciphertext share of the unique key UK to recover its plaintext share of the unique key UK. The first entity then securely shares its plaintext share of the unique key UK with a next entity in the chain of the K entities. Such secure sharing can occur peer-to-peer or via a centralized service (e.g., via a provider network) and via a secure communications channel such as one secured by HTTPS or the like. Upon receiving the first entity's plaintext share of the unique key UK, the next entity can use its private key to decrypt its ciphertext share of the unique key UK to recover its plaintext share of the unique key UK. The next entity can then securely share the plaintext share of the unique key UK it received from the first entity and its own plaintext share of the unique key UK with the next entity in the chain. This can continue through the chain of K entities until the last entity in the chain, which can be the trusted entity. The trusted entity can decrypt its ciphertext share of the unique key UK using its private key to recover its plaintext share of the unique key UK. Having received the plaintext shares of the unique key UK of the K−1 other entities from the prior entity in the chain, the trusted entity can recover the unique key UK using those plaintext shares and its own recovered plaintext share and the secret sharing algorithm. With the unique key UK recovered, the trusted process can decrypt the ciphertext datum CT to recover the plaintext datum PT.

Figure 10:
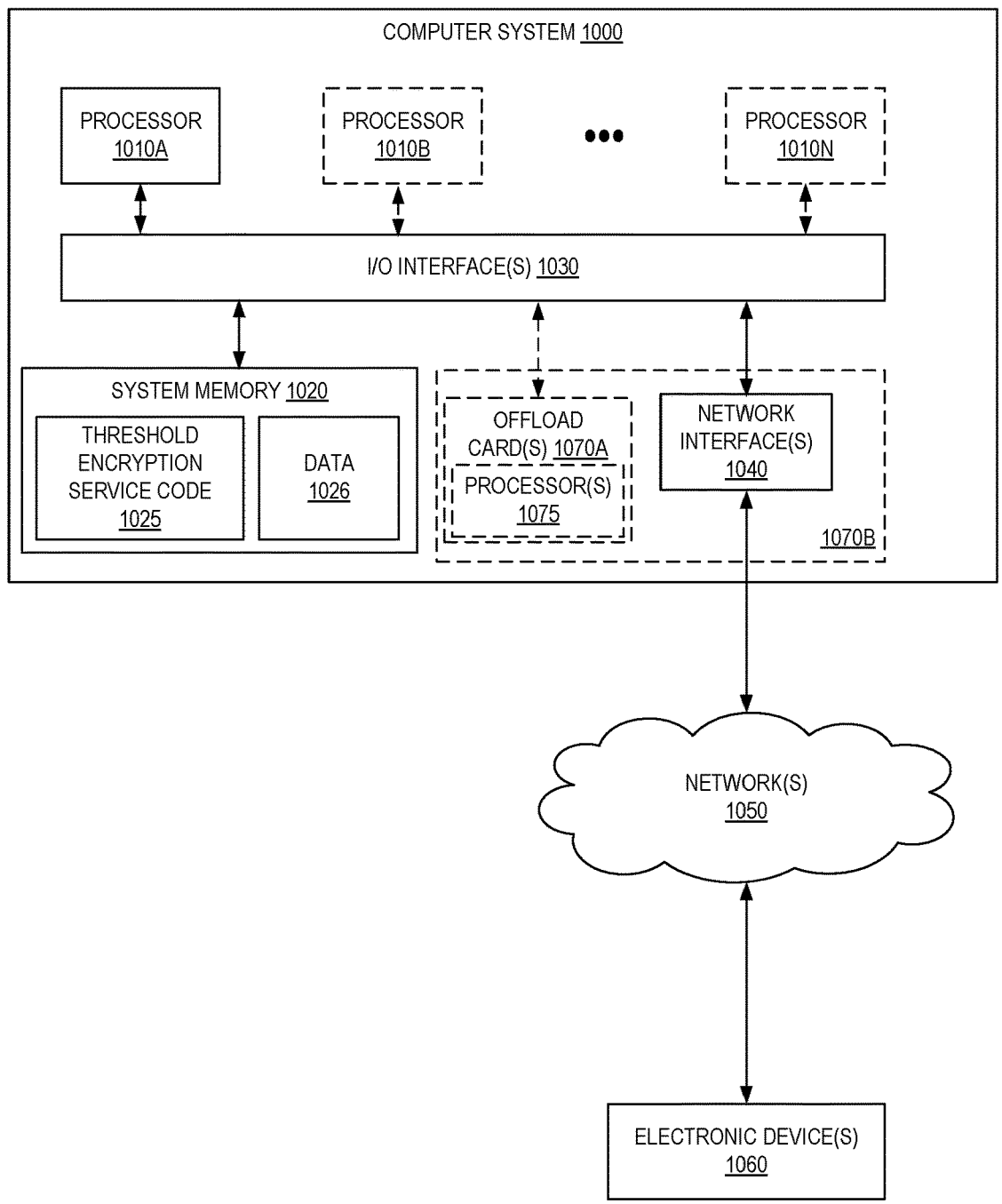
FIG. 10 is a block diagram illustrating an example computer system that can be used in some embodiments.

FIG. 10 illustrates computer system 1000 that can be used in an implementation adaptive feeding computer system 100 of FIG. 1, according to some examples. Computer system 1000 includes one or more processors 1010 coupled to system memory 1020 via input/output (I/O) interface 1030. System 1000 further includes network interface 1040 coupled to I/O interface 1030.

While FIG. 10 shows computer system 1000 as a single computing device, in some examples computer system 1000 can include one computing device or any number of computing devices configured to work together as single computer system 1000 as in a distributed, parallel, or clustered computing system arrangement.

Computer system 1000 can be a uniprocessor system including one processor 1010, or a multiprocessor system including several processors 1010 (e.g., two, four, eight, or another suitable number). Processor(s) 1010 can be any suitable processor(s) capable of executing instructions. For example, in various embodiments, processor(s) 1010 can be general-purpose or embedded processors implementing any of a variety of instruction set architectures (ISAs), such as the X86, ARM, POWERPC, SPARC, or MIPS ISAs, or any other suitable ISA. In multiprocessor systems, each of processors 1010 can commonly, but not necessarily, implement the same ISA.

System memory 1020 can store instructions and data accessible by the processor(s) 1010. In various embodiments, system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as K of N threshold encryption/decryption service code 1025 (e.g., executable to implement, in whole or in part, techniques disclosed herein for K of N threshold encryption and decryption using a key management service in a provider network) and data 1026.

I/O interface 1030 can be configured to coordinate I/O traffic between processor(s) 1010, system memory 1020, and any peripheral devices in the device, including network interface 1040 or other peripheral interfaces (not shown). I/O interface 1030 can perform any necessary protocol, timing, or other data transformations to convert data signals from one component (e.g., system memory 1020) into a format suitable for use by another component (e.g., processor(s) 1010). I/O interface 1030 can include support for devices attached through various types of peripheral buses, such as a variant of the PERIPHERAL COMPONENT INTERCONNECT (PCI) bus standard or the UNIVERSAL SERIAL BUS (USB) standard, for example. The function of I/O interface 1030 can be split into two or more separate components, such as a north bridge and a south bridge, for example. Also, some or all of the functionality of I/O interface 1030, such as an interface to system memory 1020, can be incorporated directly into processor 1010.

Network interface 1040 can be configured to allow data to be exchanged between computer system 1000 and other devices 1060 attached to network(s) 1050, such as other computer systems or devices as illustrated in FIG. 1, for example. Network interface 1040 can support communication via any suitable wired or wireless general data networks, such as types of Ethernet network, for example. Additionally, network interface 1040 can support communication via telecommunications/telephony networks, such as analog voice networks or digital fiber communications networks, via storage area networks (SANs), such as Fibre Channel SANs, and/or via any other suitable type of network and/or protocol.

Computer system 1000 can include one or more offload cards 1070A or 1070B (including one or more processors 1075, and possibly including one or more network interfaces 1040) that are connected using I/O interface 1030 (e.g., a bus implementing a version of the PERIPHERAL COMPONENT INTERCONNECT-EXPRESS (PCI-E) standard, or another interconnect such as a QUICKPATH INTERCONNECT (QPI) or ULTRAPATH INTERCONNECT (UPI)). For example, computer system 1000 can act as a host electronic device (e.g., operating as part of a hardware virtualization service) that hosts compute resources such as compute instances, and one or more offload cards 1070A or 1070B can execute a virtualization manager that can manage compute instances that execute on the host electronic device. As an example, offload card(s) 1070A or 1070B can perform compute instance management operations, such as pausing or un-pausing compute instances, launching or terminating compute instances, performing memory transfer/copying operations, etc. These management operations can be performed by offload card(s) 1070A or 1070B in coordination with a hypervisor (e.g., upon a request from a hypervisor) that is executed by other processors 1010A-1010N of computer system 1000. However, the virtualization manager implemented by offload card(s) 1070A or 1070B can accommodate requests from other entities (e.g., from compute instances themselves).

System memory 1020 is an example of a computer-accessible medium configured to store program instructions and data. However, program instructions or data can be received, sent, or stored upon different types of computer-accessible media. Computer-accessible media includes non-transitory computer-accessible media and computer-accessible transmission media. Examples of non-transitory computer-accessible media includes volatile or non-volatile computer-accessible media. Volatile computer-accessible media includes, for example, most general-purpose random-access memory (RAM) including dynamic RAM (DRAM) and static RAM (SRAM). Non-volatile computer-accessible media includes, for example, semiconductor memory chips capable of storing instructions or data in floating-gate memory cells composed of floating-gate metal-oxide-semiconductor field effect transistors (MOSFETs), including FLASH memory such as NAND flash and solid-state drives (SSD). Other examples of non-volatile computer-accessible media include read-only memory (ROM), erasable programmable ROM (EPROM), electrically erasable programmable ROM (EEPROM), ferroelectric RAM, and other computer data storage devices (e.g., disk storage, hard disks drives, optical discs, floppy disks, and magnetic tape).

Unless the context clearly indicates otherwise, the term "or" is used in the foregoing description and in the appended claims in its inclusive sense (and not in its exclusive sense) so that when used, for example, to connect a list of elements, features, acts, or operations, the term "or" means one, some, or all the elements, features, acts, or operations in the list.

Unless the context clearly indicates otherwise, the terms "comprising," "including," "having," "based on," "encompassing," and other like terms, are used in the foregoing description and in the appended claims in an open-ended fashion, and do not exclude additional elements, features, acts, or operations.

Unless the context clearly indicates otherwise, conjunctive language in the foregoing description and in the appending claims such as the phrase "at least one of X, Y, and Z," is to be understood to convey that an item, term, etc. can be either X, Y, or Z, or a combination thereof. Thus, such conjunctive language is not intended to require by default implication that at least one of X, at least one of Y, and at least one of Z to each be present.

Unless the context clearly indicates otherwise, as used in the foregoing description and in the appended claims, the singular forms "a," "an," and "the" are intended to include the plural forms as well.

What is claimed is:

1. A method comprising:

encrypting, by a key management service in a provider network, a plaintext datum using a first symmetric key to produce a ciphertext datum;

using, by an integrated service in the provider network, a secret sharing algorithm to produce a set of N plaintext shares of the first symmetric key;

encrypting, by the key management service, each plaintext share of the set of N plaintext shares using a respective public key of a set of N asymmetric key pairs to produce a respective ciphertext share of a set of N ciphertext shares;

decrypting, by the key management service, each ciphertext share of a first set of K ciphertext shares of the set of N ciphertext shares using a respective private key of the set of N asymmetric key pairs to recover a respective plaintext share of a set of K plaintext shares of the set of N plaintext shares;

encrypting, by the key management service, each plaintext share of the set of K plaintext shares using a second symmetric key to produce a respective ciphertext share of a second set of K ciphertext shares;

decrypting, by the key management service, each ciphertext share of the second set of K ciphertext shares using the second symmetric key to recover a respective plaintext share of the set of K plaintext shares;

recovering, by the integrated service, the first symmetric key from the set of K plaintext shares; and decrypting, by the key management service, the ciphertext datum using the first symmetric key to recover the plaintext datum.

2. The method of claim 1, further comprising:
creating, by the key management service, the set of N asymmetric key pairs;
creating, by the key management service, the first symmetric key; and
creating, by the key management service, the second symmetric key.

3. The method of claim 1, further comprising sending, by the integrated service, a request to the key management service to decrypt a ciphertext share of the second set of K ciphertext shares using the second symmetric key.

4. A method comprising:
encrypting a plaintext datum using a first key to produce a ciphertext datum;
using a secret sharing algorithm to produce each plaintext share of a set of N plaintext shares of the first key;
encrypting each share of the set of N plaintext shares using a respective public key of a set of N asymmetric key pairs to produce each ciphertext share of a set of N ciphertext shares;
decrypting, by a key management service in a provider network, each ciphertext share of a set of K ciphertext shares of the set of N ciphertext shares using a respective private key of the set of N asymmetric key pairs to recover each share of a set of K plaintext shares of the set of N plaintext shares;
encrypting each plaintext share of the set of K plaintext shares using a second key to produce a respective ciphertext share of a second set of K ciphertext shares;
decrypting each ciphertext share of the second set of K ciphertext shares using the second key to recover a respective plaintext share of the set of K plaintext shares;
recovering the first key from the set of K plaintext shares; and
decrypting the ciphertext datum using the first key to recover the plaintext datum.

5. The method of claim 4, further comprising:
creating, by the key management service, the set of N asymmetric key pairs; and
creating, by the key management service, the first key.

6. The method of claim 4, further comprising sending, by a trusted process, a request to the key management service to decrypt a ciphertext share of the set of K ciphertext shares using a respective private key of the set of N asymmetric key pairs.

7. The method of claim 4, further comprising:
verifying that each ciphertext share of the second set of K ciphertext shares has not expired; and
recovering the first key from the set of K plaintext shares based on verifying that the second set of K ciphertext shares have not expired.

8. The method of claim 4, wherein the plaintext datum comprises file data, document data, database data, or key data.

9. The method of claim 4, wherein:
the set of N asymmetric key pairs are associated with a set of N entities; and
the method further comprises recovering the first key from the set of K plaintext shares in response to receiving requests associated with K entities of the set of N entities.

10. The method of claim 4, further comprising:
sending the second set of K ciphertext shares to a set of personal computing devices associated with a set of K entities;
receiving the second set of K ciphertext shares from the set of personal computing devices associated with the set of K entities; and
recovering the first key from the set of K plaintext shares in response to receiving the second set of K ciphertext shares form the set of personal computing devices associated with the set of K entities.

11. The method of claim 4, further comprising:
receiving a request to put the plaintext datum into an integrated service, the request associated with an entity, the entity associated with a particular asymmetric key pair of the set of N asymmetric key pairs; and
encrypting the plaintext datum using the first key in response to receiving the request.

12. The method of claim 4, wherein the second key is specific to a set of one or more hosts in a provider network.

13. The method of claim 4, wherein the secret sharing algorithm is based on Shamir secret sharing.

14. A system comprising:
a first set of one or more computing devices to implement an integrated service in a provider network, the integrated service comprising instructions which when executed cause the integrated service to:
encrypt a plaintext datum using a first key to produce a ciphertext datum,
use a secret sharing algorithm to produce each plaintext share of a set of N plaintext shares of the first key,
encrypt each plaintext share of the set of N plaintext shares using a respective public key of a set of N asymmetric key pairs to produce each ciphertext share of a set of N ciphertext shares,
encrypt each share of a set of K plaintext shares of the set of N plaintext shares using a second key to produce a first set of K ciphertext shares,
decrypt each ciphertext share of the first set of K ciphertext shares using the second key to recover the set of K plaintext shares,
recover the first key from the set of K plaintext shares of the set of N plaintext shares, and
decrypt the ciphertext datum using the first key to recover the plaintext datum; and
a second set of one or more computing devices to implement a key management service in a provider network, the key management service comprising instructions which when executed cause the key management service to:
decrypt each ciphertext share of a second set of K ciphertext shares of the set of N ciphertext shares using a respective private key of the set of N asymmetric key pairs to recover each plaintext share of the set of K plaintext shares.

15. The system of claim 14, wherein the key management service further comprises instructions which when executed cause the key management service to:
create the set of N asymmetric key pairs; and
create the first key.

16. The system of claim 14, wherein the integrated service further comprises instructions which when executed cause the integrated service to send a request to the key management service to decrypt a ciphertext share of the second set of K ciphertext shares using a respective private key of the set of N asymmetric key pairs.

17. The system of claim 14, wherein the integrated service further comprises instructions which when executed cause the integrated service to:
verify that each ciphertext share of the first set of K ciphertext shares has not expired; and recover the first key from the set of K plaintext shares based on verifying that the first set of K ciphertext shares have not expired.

18. The system of claim 17, wherein:

the first key is to comprise a first symmetric key; and the second key is to comprise a second symmetric key.

19. The system of claim 14, wherein the plaintext datum comprises file data, document data, database data, or key data.

20. The system of claim 14, wherein:

the set of N asymmetric key pairs are associated with a set of N entities; and the integrated service further comprises instructions which when executed cause the integrated service to recover the first key from the set of K plaintext shares in response to receiving requests associated with K entities of the set of N entities.

* * * * *